United States Patent
Jin et al.

(10) Patent No.: US 10,033,542 B2
(45) Date of Patent: Jul. 24, 2018

(54) SCHEDULING MECHANISMS IN FULL DUPLEX CABLE NETWORK ENVIRONMENTS

(71) Applicant: CISCO TECHNOLOGY, INC., San Jose, CA (US)

(72) Inventors: Hang Jin, Plano, TX (US); John T. Chapman, Coto de Caza, CA (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 15/052,466

(22) Filed: Feb. 24, 2016

(65) Prior Publication Data

US 2017/0019239 A1    Jan. 19, 2017

Related U.S. Application Data

(60) Provisional application No. 62/192,924, filed on Jul. 15, 2015.

(51) Int. Cl.
*H04L 5/14* (2006.01)
*H04L 12/28* (2006.01)
*H04L 1/00* (2006.01)
*H04L 12/931* (2013.01)

(52) U.S. Cl.
CPC .......... *H04L 12/2801* (2013.01); *H04L 1/004* (2013.01); *H04L 49/70* (2013.01); *H04L 5/1438* (2013.01)

(58) Field of Classification Search
CPC ..... H04L 12/2801; H04L 49/70; H04L 1/004; H04L 5/1438
See application file for complete search history.

(56) References Cited

U.S. PATENT DOCUMENTS

| 6,725,462 B1 | 4/2004 | Kaplan |
| 6,912,209 B1 | 6/2005 | Thi et al. |
| 7,856,049 B2 | 12/2010 | Currivan et al. |

(Continued)

FOREIGN PATENT DOCUMENTS

| EP | 0182096 A2 | 5/1986 |
| EP | 0936781 A1 | 8/1999 |

(Continued)

OTHER PUBLICATIONS

U.S. Appl. No. 15/052,428, filed Feb. 24, 2016, 2016, entitled "Full Duplex Network Architecture in Cable Network Environments," Inventors: Hang Jin, et al.

(Continued)

*Primary Examiner* — Thai Nguyen
(74) *Attorney, Agent, or Firm* — Merchant & Gould P.C.

(57) ABSTRACT

An example method for scheduling in full duplex cable network environments is provided and includes categorizing a plurality of cable modems in a cable network into interference groups, scheduling upstream transmissions and downstream receptions for cable modems in each interference group, such that no cable modem of any one interference group transmits upstream in a frequency range simultaneously as another cable modem in the same interference group receives downstream in the frequency range, generating scheduling information of the scheduling, and transmitting the scheduling information to the cable modems.

19 Claims, 26 Drawing Sheets

- $CM_1$ AND $CM_2$ BELONG TO THE SAME INTERFERENCE GROUP
- THE INTELLIGENT MAC SCHEDULER WILL NOT SCHEDULE $CM_2$ TO TRANSMIT ON THE SAME FREQUENCY AND AT THE SAME TIME WHEN $CM_1$ IS RECEIVING

(56) References Cited

U.S. PATENT DOCUMENTS

| | | | |
|---|---|---|---|
| 8,457,584 | B2 | 6/2013 | Currivan |
| 8,565,266 | B1 | 10/2013 | Fox et al. |
| 8,594,118 | B2 | 11/2013 | Cooper et al. |
| 9,031,409 | B2 | 5/2015 | Nandiraju et al. |
| 8,937,992 | B2 | 6/2015 | Cooper et al. |
| 9,136,943 | B2 | 9/2015 | Thompson et al. |
| 9,160,463 | B2 | 10/2015 | Hunter |
| 9,172,429 | B2 | 10/2015 | Gerszberg et al. |
| 9,712,193 | B1 | 7/2017 | Jin |
| 9,775,116 | B2 | 9/2017 | Jin et al. |
| 2001/0038423 | A1 | 11/2001 | Twitchell et al. |
| 2002/0032004 | A1 | 3/2002 | Widrow |
| 2006/0262722 | A1* | 11/2006 | Chapman ............ H04L 12/2801 370/229 |
| 2011/0149764 | A1 | 6/2011 | Wietfeldt et al. |
| 2011/0170473 | A1 | 7/2011 | Proctor, Jr. et al. |
| 2012/0269242 | A1 | 10/2012 | Prodan et al. |
| 2012/0275792 | A1 | 11/2012 | Nandiraju et al. |
| 2013/0101116 | A1 | 4/2013 | Ross et al. |
| 2013/0114480 | A1* | 5/2013 | Chapman ............. H04L 5/1469 370/282 |
| 2013/0194984 | A1 | 8/2013 | Cheng et al. |
| 2013/0332978 | A1 | 12/2013 | Rakib |
| 2014/0010269 | A1 | 1/2014 | Ling et al. |
| 2014/0022926 | A1 | 1/2014 | Ling et al. |
| 2014/0022943 | A1* | 1/2014 | Ling .................... H04L 1/0026 370/254 |
| 2014/0133352 | A1 | 5/2014 | Chapman et al. |
| 2015/0082363 | A1 | 3/2015 | Gomez et al. |
| 2015/0188653 | A1 | 7/2015 | Hanks et al. |
| 2015/0188668 | A1 | 7/2015 | Al-Banna |
| 2015/0257165 | A1 | 9/2015 | Gale et al. |
| 2015/0382361 | A1 | 12/2015 | Sabapathi et al. |
| 2016/0065250 | A1 | 3/2016 | Volokhine et al. |
| 2017/0019146 | A1 | 1/2017 | Jin et al. |
| 2017/0019241 | A1 | 1/2017 | Jin et al. |
| 2017/0019242 | A1 | 1/2017 | Jin et al. |
| 2017/0033915 | A1 | 2/2017 | McCoy et al. |
| 2017/0085398 | A1 | 3/2017 | Liu |
| 2017/0104506 | A1 | 4/2017 | Liu et al. |
| 2017/0244445 | A1 | 8/2017 | Jin et al. |

FOREIGN PATENT DOCUMENTS

| | | | |
|---|---|---|---|
| EP | 1374511 | B1 | 1/2004 |
| EP | 1429470 | A2 | 6/2004 |
| EP | 1705824 | | 9/2006 |
| EP | 2244380 | A1 | 1/2010 |
| EP | 2879301 | A1 | 6/2015 |
| WO | WO 2013/095386 | | 6/2013 |
| WO | WO 2013/126297 | | 8/2013 |
| WO | 2015021461 | A1 | 2/2015 |
| WO | WO 2015/162104 | | 10/2015 |
| WO | 2016033266 | A1 | 3/2016 |
| WO | 2017011143 | A1 | 1/2017 |
| WO | WO 2017/011142 | | 1/2017 |
| WO | WO 2017/011144 | | 1/2017 |
| WO | WO 2017/011146 | | 1/2017 |

OTHER PUBLICATIONS

U.S. Appl. No. 15/052,499, filed Feb. 24, 2016, entitled "Interference Suppression in Full Duplex Cable Network Environments," Inventors: Hang Jin, et al.

U.S. Appl. No. 15/052,542, filed Feb. 24, 2016, entitled "Interference Relationship Characterization in Full Duplex Cable Network Environments," Inventors: Hang Jin, et al.

Schnoor, Jon, et al., "Leveraging Full Band RF Capture to Improve the Customer Experience and Operational Performance", ubeeinteractive, White Paper, First Published on or about Jan. 5, 2015, 22 pages.

PCT Sep. 22, 2016 International Search Report and Written Opinion of the International Searching Authority from International Application PCT/US/2016/038269.

PCT Sep. 30, 2016 International Search Report and Written Opinion of the International Searching Authority from International Application PCT/US/2016/038272.

PCT Oct. 17, 2016 International Search Report and Written Opinion of the International Searching Authority from International Application PCT/US/2016/038268; 12 pages.

PCT Dec. 6, 2016 International Search Report and Written Opinion of the International Searching Authority from International Application PCT/US/2016; 17 pages.

U.S. Office Action dated Jul. 20, 2017 cited in U.S. Appl. No. 15/052,428, 22 pgs.

U.S. Office Action dated Aug. 10, 2017 cited in U.S. Appl. No. 15/052,499, 13 pgs.

European Office Action dated Nov. 7, 2017 cited Application No. 17167831.1, 7 pgs.

European Combined Search and Examination Report dated Nov. 24, 2017 cited in Application No. GB1708266.0, 7 pgs.

International Search Report dated Jan. 26, 2018 cited in Application No. PCT/US2017/061607, 13 pgs.

International Search Report dated Jan. 29, 2018 cited in Application No. PCT/US2017/061574, 14 pgs.

* cited by examiner rx=rx0+rx_i;
tx0=conv(w1, rx) - conv(w0,rx_r)

```
% Equalizer 1
function   [tx0n,U0,dq0,w0,U1,dq1,w1]=...,
     eq1(U0,dq0,w0,U1,dq1,w1,lamda0,alpha0,lamda1,alpha1,rx,rx_r,rx_r0,tau_i,tau_r)

[n0,m0]=size(U0);
m0_sect=n0/m0;

err0=rx(end-tau_i);

wa=[]; Ua=[]; dqa=[];

for i=1:m0_sect m_off=(i-1)*m0;
    ref0=rx_r0(end-m_off:-1:end-m_off-m0+1);
    w0t=w0(m_off+1:m_off+m0);
    U0t=U0(m_off+1:m_off+m0,:);
    dq0t=dq0(m_off+1:m_off+m0);

[w0t,U0t,dq0t,err0]=coefficient_update(U0t,dq0t,w0t,lamda0,alpha0,err0,ref0);
    wa=[wa;w0t];
    Ua=[Ua;U0t];
    dqa=[dqa;dq0t];

end
w0=wa;
U0=Ua;
dq0=dqa;

[n1,m1]=size(U1);
m1_sect=n1/m1;

err1=rx_r(end-tau_r);

wa=[]; Ua=[]; dqa=[];

for i=1:m1_sect m_off=(i-1)*m1;
    ref1=rx_r0(end-m_off:-1:end-m_off-m1+1);
    w1t=w1(m_off+1:m_off+m1);
    U1t=U1(m_off+1:m_off+m1,:);
    dq1t=dq1(m_off+1:m_off+m1);

[w1t,U1t,dq1t,err1]=coefficient_update(U1t,dq1t,w1t,lamda1,alpha1,err1,ref1);
    wa=[wa;w1t];
    Ua=[Ua;U1t];
    dqa=[dqa;dq1t];

end
w1=wa;
U1=Ua;
dq1=dqa;

aa=norm(w1);
w0_tmp = w0/aa;
w1_tmp = w1/aa;
tx0n = w1_tmp'*rx(end-tau_i:-1:end-tau_i-m1_sect*m1+1)-...,
     w0_tmp'*rx_r(end-tau_r:-1:end-tau_r-m0_sect*m0+1);
```

```
% Equalizer 2 function [tx1n,U2,dq2,w2,lamda2,alpha2]=eq2(U2,dq2,w2,lamda2,alpha2,tau,tx0)

[n,m2]=size(U2);
m_sect=n/m2;

err=tx0(end);

wa=[]; Ua=[]; dqa=[];

for i=1:m_sect;

m_off=(i-1)*m2;
    ref2=tx0(end-m_off-2*tau:-1:end-m_off-2*tau-m2+1);
    w2t=w2(m_off+1:m_off+m2);
    U2t=U2(m_off+1:m_off+m2,:);
    dq2t=dq2(m_off+1:m_off+m2);

[w2t,U2t,dq2t,err]=coefficient_update(U2t,dq2t,w2t,lamda2,alpha2,err,ref2);
    wa=[wa;w2t];
    Ua=[Ua;U2t];
    dqa=[dqa;dq2t];

end w2=wa;
U2=Ua;
dq2=dqa;
tx1n=err;
```

222

SCHEDULING MECHANISMS IN FULL DUPLEX CABLE NETWORK ENVIRONMENTS

CROSS-REFERENCE TO RELATED APPLICATION

This application claims the benefit of priority under 35 U.S.C. § 119(e) to U.S. Provisional Application Ser. No. 62/192,924 entitled "FULL DUPLEX OPERATION IN CABLE NETWORKS," filed Jul. 15, 2015, which is hereby incorporated by reference in its entirety.

TECHNICAL FIELD

This disclosure relates in general to the field of communications and, more particularly, to scheduling mechanisms in full duplex cable network environments.

BACKGROUND

Consumer appetite for bandwidth continues to grow exponentially in the cable network market. In some cable network architectures, including remote physical layer (RPHY) with digital fiber, the coax fiber becomes the bottleneck in throughput, stifling increase in bandwidth. The typical multi-system operator (MSO) is out of options currently, due to the inherent technological limitations of existing cable network components. For example, the Shannon channel capacity limit (e.g., tight upper bound on rate at which information can be reliably transmitted over a communications channel) has practically been achieved already in existing cable network architectures. There is consumer driven demand to extend the frequency spectrum beyond 1.2 GHz, but a conventional extension would require extensive network upgrade. Upgrades in network components are limited by capital expenditure (CAPEX) budget limitations. All optics (fiber to the home (FTTH) have excessive CAPEX. In such scenarios, it may be desirable to offer new services with full downstream/upstream (DS/US) throughput (e.g., matching Gigabit-capable Passive Optical Networks (GPON) standard of 2.5 Gbits downstream/1 Gbits upstream ratio) with limited capital expenditure for outside plant upgrade.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 24 is a simplified diagram illustrating yet other example operations that may be associated with an embodiment of the communication system;

DETAILED DESCRIPTION OF EXAMPLE EMBODIMENTS

Overview

An example method for scheduling in full duplex cable network environments is provided and includes categorizing (e.g., classifying, grouping, sorting, labeling, tagging, etc.) a plurality of cable modems in a cable network into interference groups, scheduling (e.g., arranging) upstream transmissions and downstream receptions for cable modems in each interference group, such that no cable modem of any one interference group transmits upstream in a frequency range simultaneously as another cable modem in the same interference group receives downstream in the frequency range, generating scheduling information of the scheduling, and transmitting the scheduling information to the cable modems.

As used herein, the term "upstream" refers to a communication direction from the cable modems towards an interior of the cable network, and the term "downstream" refers to another communication direction from the interior of the cable network towards the cable modems.

Example Embodiments

Figure 1A:
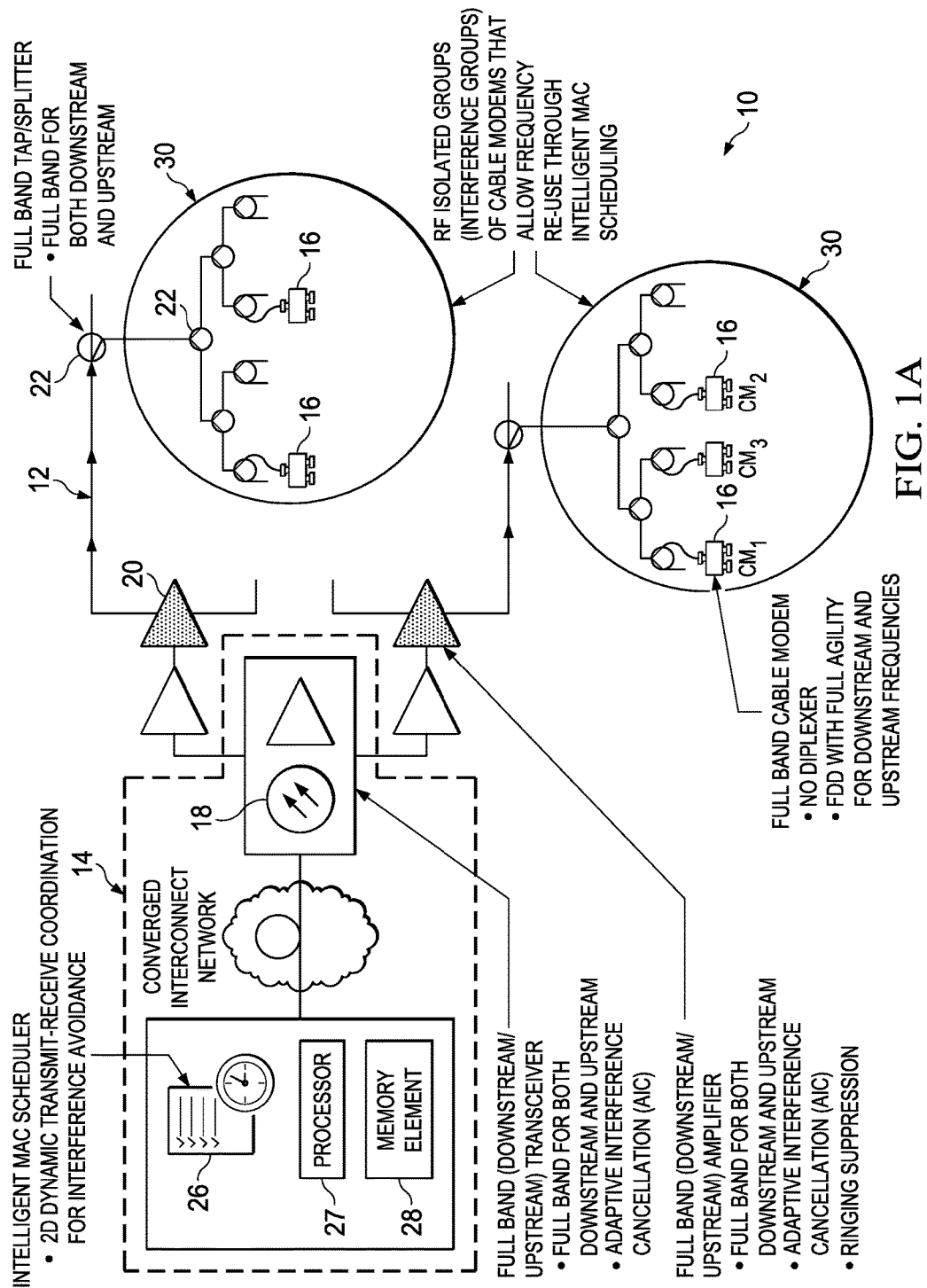
FIG. 1A is a simplified block diagram illustrating a communication system comprising a full duplex network architecture in cable network environments.

Turning to FIG. 1A, FIG. 1A is a simplified block diagram illustrating a communication system 10 enabling full duplex network communication in cable network environments in accordance with one example embodiment. FIG. 1 illustrates a cable network 12 (indicated generally by an arrow) facilitating full duplex communication between a cable modem termination system (CMTS) 14 and one or more cable modems (CMs) 16. Network 12 includes transceivers 18, amplifiers 20, and taps and splitters 22. CMTS 14 includes an intelligent media access control (MAC) scheduler 26 that enables a two-dimensional transmission-reception (T-R) coordination for interference avoidance, along with a processor 27 and a memory element 28 that facilitate executing instructions comprised in MAC scheduler 26. In various embodiments, cable modems 16 may be grouped into various interference groups 30 to enable full duplex communication with little to no interference. Groups 30 may comprise radio frequency (RF) isolated groups that allow frequency re-use through intelligent MAC scheduling.

Transceivers 18 enable full band communication for both upstream and downstream network traffic and implement dynamic interference cancellation, also referred to herein as adaptive interference cancellation (AIC). Note that as used herein, the term "upstream" refers to a communication direction from cable modems 16 towards CMTS 14; the term "downstream" refers to a communication direction from CMTS 14 towards cable modems 16. Amplifiers 20 enable full band communication for both upstream and downstream network traffic, and implement AIC with ringing (e.g., echo) suppression. Taps and splitters 22 may enable full band communication for downstream and upstream traffic.

Each of cable modems 16 supports full band communication, but operates in simplex mode for upstream or downstream transmission. For example, each of cable modems 16 may be assigned non-overlapping frequency bands for upstream and downstream communication, yet the same set of carriers can be used for the downstream and upstream communication, yielding a doubling of throughput compared to currently existing non-full duplex systems. Communication system 10 can enable higher bandwidth (e.g., bandwidth is the maximum amount of data that can travel through a communication channel) and throughput (e.g., throughput refers to the quantity of data that actually does travel through the communication channel successfully) through full-duplex communication.

To explain generally, bandwidth limitations are solved in some communication networks through duplex communication. In a general sense, duplex communication is bidirectional, allowing both end nodes of a communication channel to send and receive data simultaneously and one at a time. Both end nodes have the ability to operate as sender and receiver at the same time, or take turns sending or receiving data. Duplex-based systems typically have dual communication channels that provide separate medium (e.g., paths) for upstream (US) (e.g., uplink, outgoing, transmitting) and downstream (DS) (e.g., downlink, incoming, receiving) communication. In full duplex mode, the node sends and receives signals simultaneously on the same frequency range.

Examples of communication techniques include frequency division duplexing (FDD) and time division duplexing (TDD). In FDD, separate frequency bands (e.g., carrier frequencies) are used at the transmitter and receiver. Because FDD uses different frequency bands for upstream and downstream operations, the upstream and downstream communication do not interfere with each other. Examples of FDD systems include the following: asymmetric digital subscriber line (ADSL) and very-high-bitrate digital subscriber line (VDSL); cellular systems, including UMTS/WCDMA Frequency Division Duplexing mode and the CDMA2000 system; IEEE 802.16 WiMax Frequency Division Duplexing mode.

In TDD, the upstream communication is separated from the downstream communication by allocation of different time slots in the same frequency range. For example, users, such as cable modems, are allocated time slots for upstream transmission and downstream reception. TDD allows asymmetric flow for upstream and downstream data transmission. TDD is advantageous in cases where upstream and downstream data rates are asymmetric. The capacities of downstream communication links and upstream communication links are altered in favor of one direction over another by providing greater time allocation through time slots to downstream reception intervals than to upstream transmission intervals.

Full duplex communication mechanisms that are not FDD or TDD have not been used in cable networks, because the inherent network architecture and communication protocols do not support such communication mechanisms. For example, cable was first introduced in the United States in the late 1950s. For the next 30 years, nearly every mile of buried cable was half duplex; thus, the network was capable of broadband transmission in the downstream direction, from the head end to the subscriber, but not in the upstream direction—communication from the subscriber back to the head end was possible only via a telephone line. In recent years, cable operators have been investing heavily to upgrade their buried cables from half to full duplex as a necessary first step to capitalize on the demand for integrated data and voice services. However, upstream transmissions continue to be slower than downstream receptions (typically 1.5 to 3 Mbps downstream and 500 Kbps to 2.5 Mbps upstream).

Nevertheless, with a properly configured cable network architecture, such as cable network 12 of communication system 10, full duplex communication can drastically expand available upstream spectrum (e.g., estimated 5 to 10 times upstream capacity increase). Full duplex communication can provide near symmetric downstream and upstream throughput. System capacities (e.g., bandwidth) can improve with full duplex communication. Moreover, full duplex communication may be technology-agnostic and/or standards/agnostic.

However, implementing full duplex in existing cable networks meet with certain challenges. For example, a large transmitted signal coupled back to the receiver due to reflection (e.g., self-interference from the transmit pathway into the receive pathway within one and same transceiver) at any of the network components, including CMTS 14, cable modems 16, transceivers 18, amplifiers 20 and taps and splitters 22 can kill the received signal at the receiver. Moreover, upstream transmit signal from one of cable modems 16 may leak into the downstream pathway of another of cable modems 16, causing interference. Unlike self-interference, such inter-CM interference cannot be removed with mere echo cancellation techniques because the upstream transmit signal is unknown in the downstream pathway.

Embodiments of communication system 10 can resolve such issues by enabling full duplex communication using appropriately configured components and spectrum sharing techniques. Full duplex communication can be successfully implemented by suppressing (e.g., eliminating) transmitted signals that are coupled back to the receiver (e.g., as an echo, as an upstream signal leaking into the downstream pathway and vice versa, etc.). Sufficient transmitted signal cancellation and/or elimination can be achieved by leveraging (among other parameters) state of art devices and digital signal processing technologies, high speed and high performance (e.g., high resolution) analog to digital converters (ADC), powerful devices with more signal processing capability, an AIC scheme, and advanced MAC scheduling for spectrum sharing. In various embodiments, the AIC scheme suppresses at a receiver (of transceiver 18 or amplifier 20 appropriately) a signal transmitted by a transmitter (of transceiver 18 or amplifier 20 appropriately). Further, in addition to the AIC scheme, full band amplifier 20 implements a ringing suppression scheme implementing echo cancellation.

According to embodiments of communication system 10, MAC scheduler 26 implements a two-dimensional transmission-reception (T-R) coordination scheme among cable modems 16 in cable network 12. According to the T-R coordination scheme, cable modems 16 are categorized into interference groups 30, such that no cable modem of any one interference group transmits upstream in a frequency range simultaneously as another cable modem in the same interference group receives downstream in the frequency range, facilitating full duplex communication in cable network 12 across the frequency range. Cable modems 16 operate in simplex mode, while supporting full band operation for downstream reception and upstream transmission. Note that cable modems 16 in different interference groups 30 transmit upstream and receive downstream simultaneously in the frequency range. In various embodiments, CMTS 14 receives and transmits network traffic across the entire frequency range, facilitating full duplex communication in cable network 12. In some embodiments, cable modems 16 are classified into interference groups 30 through a ranging process.

In some embodiments, MAC scheduler 26 implements the T-R coordination centrally in cable network 12. To explain in further detail, the available frequency spectrum of communication system 10 is divided into frequency resource blocks, comprising a band of adjacent frequencies (e.g., contiguous sub-carriers). OFDM symbols in time space are grouped into the resource blocks in frequency space. According to the centrally implemented T-R coordination scheme, MAC scheduler 26 partitions resource blocks available to any one interference group into at least a first portion and a second portion; the first portion is reserved for upstream transmission, and the second portion is reserved for downstream reception, such that the first portion and the second portion do not overlap in time and frequency for any cable modem in the interference group. In other embodiments, MAC scheduler 26 implements the T-R coordination in a distributed manner in cable network 12. According to the distributed T-R coordination scheme, cable modems 16 manage scheduling upstream transmission and downstream reception in any one interference group. MAC scheduler 26 transmits a downstream transmission map ahead of downstream transmission to cable modems 16, and cable modems 16 schedule respective upstream transmission according to the downstream map.

In various embodiments, a cable network operator may upgrade an existing cable network operating in simplex mode to a full duplex mode by adding appropriate components supporting full duplex communication. For example, the cable network operator may implement a method for full duplex communication in cable network 12 by operating MAC scheduler 26 implementing the above-described two-dimensional T-R coordination scheme among cable modems 16, operating full band transceiver 18 implementing the AIC scheme, and operating full band amplifier 20 implementing the AIC scheme and the ringing suppression scheme implementing echo cancellation. The cable network operator may add to cable network 12 one or more taps and splitters 22 that support full band communication in cable network 12.

Figure 1B:
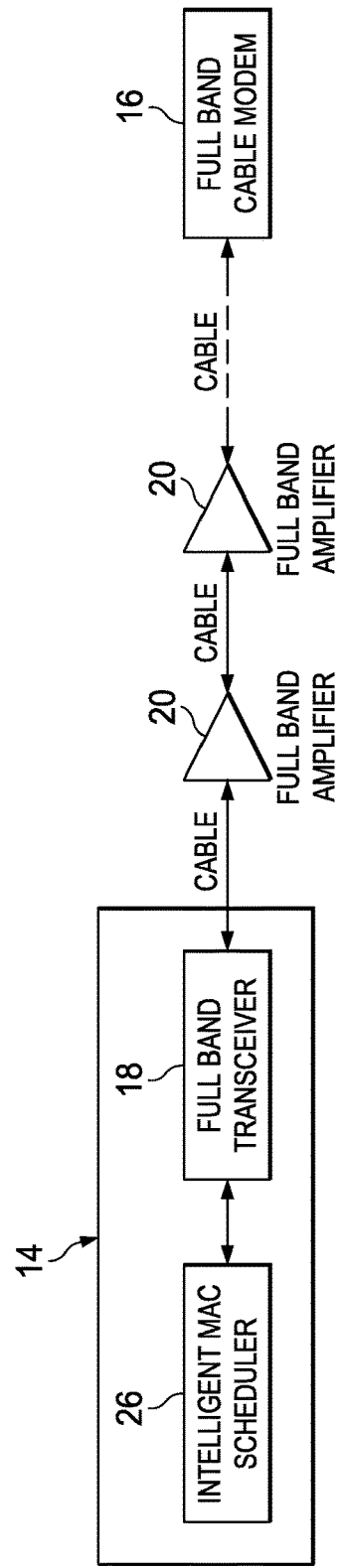
FIG. 1B is a simplified block diagram illustrating example details of embodiments of the communication system.

Moreover, capital expenditure for upgrading to full duplex communication may be reduced by reusing certain components. Turning to FIG. 1B, FIG. 1B shows a simplified diagram illustrating network components of network 12 that may be replaced or added in existing cable networks to enable full duplex communication. Note that in some embodiments, such as N+m architecture with m=0 (e.g., N stands for number of nodes, m stands for number of amplifiers after each node), amplifiers 20 are not used at all. In an example embodiment, a majority (e.g., 97%) of taps and splitters 22 can be re-used for full duplex operation. This may be because standard tap and splitter combiner can operate in full band (e.g., 5-1000 MHz) for both upstream and downstream, supporting full-duplex communication in the supported frequency band. Only a minority (e.g., 3%) of taps and splitters 22 that do not support full band downstream and upstream may have to be replaced for full duplex communication. Likewise, because cable modems 16 are not operating in full duplex mode singly, they may be reused if they support the full band (e.g., they include capability to perform FDD with full agility for upstream and downstream frequencies). Components in network 12 that include diplexers (such as transceivers 18 and amplifiers 20) may have to be replaced entirely to support full duplex communication.

In various embodiments, intelligent MAC scheduling may be used to avoid interference among neighboring cable modems 16. Intelligent MAC scheduling can include: (i) ranging (e.g., measuring and/or monitoring interference among cable modems 16, for example, by establishing interference groups 30), and (ii) T-R coordination (e.g., transmissions and receptions are coordinated through a centric or distributed scheduler to avoid interference among cable modems 16). In some embodiments, the T-R coordination implements a two dimensional (frequency and time) interference avoidance scheme.

Ranging facilitates assigning cable modems 16 to one or more interference groups 30. In some embodiments, during ranging, each of cable modems 16 transmits an interference pattern upstream. For example, the interference pattern could comprise a single tone at one or more frequencies. Other cable modems 16 attempt to receive the interference pattern on their downstream reception frequencies. Different frequencies and/or marked tones for the interference pattern may facilitate many cable modems 16 using the same ranging frequency interval. In some cases, one cable modem may interfere with another, which interferes with a third cable modem, yet the third cable modem may not interfere with the first cable modem. For example, there may be cases in which $CM_1$ interferes with $CM_2$, which interferes with $CM_3$, but $CM_3$ does not interfere with $CM_1$, leading to overlapping interference groups 30. In one example embodiment, such overlapping groups may be lumped into one overarching group, with sub-groups therein.

In some embodiments, one of cable modems 16 may be scheduled to transmit on a specific frequency in a maintenance time window, and other cable modems 16 report their downstream modulation error ratio (MER) or interference level on that frequency to MAC scheduler 26 (or CMTS 14, or other appropriate report receiving module in cable network 12). Based on the reported downstream MER or interference level (as the case may be), a determination may be made as to which cable modems 16 are interfered by the transmitting one of cable modems 16. The interfered cable modems 16 are associated with the transmitting one of cable modems 16 on that frequency in a particular one of interference groups 30. The process may be repeated for various frequencies and cable modems 16. Interference groups 30 may not be updated often. Updating interference groups 30 comprises informing cable modems 16 categorized in respective interference groups 30 as to their membership. Membership of cable modems 16 may change due to various environmental conditions, network load balancing, bandwidth usage by particular CMs, and other factors. In some embodiments, interference groups 30 may be updated when there are changes to Hybrid fiber-coaxial (HFC); in other embodiments, interference groups 30 may be updated after a predetermined time interval (e.g., 24 hours).

In some embodiments, intelligent MAC scheduler 26 implements static frequency planning for T-R coordination. Spectrum sharing may be implemented through dynamic transmission coordination to avoid interferences. To explain interferences, consider upstream transmission from $CM_1$. The upstream transmission from $CM_1$ may be coupled into $CM_2$ at a common tap-splitter 22 with limited isolation and cause interference with downstream reception at $CM_2$. The interference from $CM_1$ cannot be cancelled out at $CM_2$ as $CM_2$ does not have any reference signal from $CM_1$ (e.g., $CM_2$ cannot determine whether downstream reception at $CM_2$ is from CMTS 14 or from $CM_1$).

To reduce interferences at cable modems 16, a CM frequency planning scheme is implemented in various embodiments. The frequency spectrum used in cable network 12 is divided into multiple frequency ranges that align with channel boundaries. For each one of cable modems 16 and each frequency range, those cable modems 16 are identified whose upstream transmissions interfere with downstream reception of that specific one of cable modems 16, and those cable modems 16 whose downstream receptions are interfered by upstream transmissions of that specific one of cable modems 16, if they operate on that same frequency (as is the case in full duplex communication). MAC scheduler 26 avoids assigning cable modems 16 to frequency ranges that cause interferences among them.

Full duplex communication affects operation of various components of cable network 12, and the implications are different on different components. For example, the implications on CMTS 14 arise in the two areas: (a) full duplex involves CMTS 14 supporting throughputs of full band downstream traffic and upstream traffic (this is mainly a capacity specification to support the throughput); and (b) frequency planning and intelligent MAC scheduling, including establishing interfering/interfered lists according to algorithms described herein, executing frequency planning algorithms and determining frequency assignments, and T-R coordination as appropriate. In some embodiments, such functions can be integrated into MAC scheduler 26 at CMTS 14.

In some embodiments, full duplex communication may involve a major re-design of transceiver 18. Transceiver 18 may be reconfigured by replacing its diplexer with a 2-way combiner-splitter and other modifications. Transceiver 18 may be rewired to support full band operation for both downstream and upstream, and for high capacity to support the throughput of full band downstream and upstream. Transceiver 18 may also be changed to implement AIC algorithms. Other functions to support full duplex include: measuring interferences among cable modems 16 for frequency planning; and measuring cable modem downstream timing and upstream timing for supporting T-R coordination as appropriate.

Although cable modems 16 operate in FDD mode (e.g., downstream reception and upstream transmission on different frequencies in any one cable modem), cable modems 16 support full band FDD operation of both downstream and upstream. Full band FDD means downstream and upstream frequencies can be on any frequencies between 10 MHz to 1000 MHz (1.2 GHz) although they do not overlap each other. This means that cable modems 16 do not include any diplexer. In addition, cable modems 16 have full frequency agility, good RF fidelity (e.g., with minimized guard band between downstream and upstream), and high capacity to support full band throughput (e.g., 500 MHz DS and 500 MHz US).

Amplifier 20 may be subject to a major re-design to support full duplex communication. For example, amplifier 20 may be re-designed with no diplexer, full band operation, and digitized input signal. Interference cancellation blocks including ringing suppression may be added to existing amplification functions. Amplifier 20 implementing a two-step interference cancellation scheme can provide over 50 dB interference suppression and push the interference below the noise floor. However, some signal integrity degradation may be inevitable. For example, if the interference is suppressed to 6 dB below the system noise floor, there may be 1 dB degradation to signal's ratio of signal-to-noise ratio (SNR) to modulation error ratio (MER) (SNR/MER). In some embodiments, the maximum number of the cascaded amplifiers (including trunk, bridge and extender) may be limited to 5 (N+5, max 5 dB degradation at the end of the line), for example, to minimize signal degradation.

The optical link in HFC may be changed to support full duplex operation by providing high capacity for both DS and US to support the high throughput of coaxial network under full duplex. In a general sense, amplifiers in the coax network may be replaced. Devices with built-in diplexer (for example, reverse attenuator) in the coax network may be replaced (3% of taps, according to Cisco CATV market). System gain re-engineering/re-balance may be suitable due to the extended frequencies. Some of the devices may be replaced (with better port-to-port isolation) to enhance isolation among cable modems 16. Occasionally, the coax network may be re-architected to enhance isolation among cable modems 16. For example, an amplifier may be added right before a splitter to create isolated cable modem groups.

Full duplex could significantly increase cable access upstream throughput. An enabler for full duplex is interference cancellation and avoidance. Simulation results show that interference cancellation can be achieved through advanced digital signal processing algorithms. Full duplex is perpendicular to (e.g., orthogonal to, independent of, etc.) cable access technologies and high layer architectures; thus, it can work with any high level protocols and architectures. Full duplex can be used with existing access technology (CABU R-PHY shelf/node and CDBU CM), or as a candidate for next generation DOCSIS access technology. Full duplex is novel and substantial, and has business and technology impacts that may go beyond cable access (wireless, for example).

Turning to the infrastructure of communication system 10, the network topology can include any number of cable modems, customer premises equipment, servers, switches (including distributed virtual switches), routers, amplifiers, taps, splitters, combiners and other nodes inter-connected to form a large and complex network. Network 12 represents a series of points or nodes of interconnected communication pathways for receiving and transmitting packets and/or frames of information that are delivered to communication system 10. A node may be any electronic device, computer, printer, hard disk drive, client, server, peer, service, application, or other object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Cable network 12 offers a communicative interface between cable network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 12 may implement any suitable communication protocol for transmitting and receiving data packets within communication system 10. The architecture of the present disclosure may include a configuration capable of DOCSIS, TCP/IP, TDMA, and/or other communications for the electronic transmission or reception of signals in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), coaxial fiber, telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In particular embodiments, CMTS 14 may comprise a hardware appliance with appropriate ports, processors, memory elements, interfaces, and other electrical and electronic components that facilitate the functions described herein, including providing high speed data services, such as cable Internet or voice over Internet Protocol (e.g., in the form of digital, RF, or other suitable signals) to cable subscribers, such as cable modems 16. In various embodiments, CMTS 14 comprises a Universal Broadband Router (uBR) with features that enable it to communicate with a Hybrid Fiber Coaxial (HFC) cable network via a suitable cable modem card, which provides an interface between the uBR protocol control information (PCI) bus and radio frequency (RF) signals on the DOCSIS HFC cable network.

In some embodiments, CMTS 14 may comprise a converged cable access platform (CCAP) core that transmits and receives digital signals in IP protocols, coupled with one or more physical interface (PHY) transceiver(s), such as transceiver 18 that convert the digital IP signals into RF signals, and vice versa. The PHY transceivers, such as transceiver 18, may be co-located with the CCAP core at a common location, or may be located remote from the CCAP core and connected over a converged interconnect network (CIN). In some embodiments, CMTS 14 may comprise a single CCAP core and a plurality of PHY transceivers, such as transceiver 18. CMTS 14 is connected (e.g., communicatively coupled, for example, through wired or wireless communication channels) to cable modems 16, transceiver 18, and amplifier 20 in cable network 12.

In some embodiments, intelligent MAC scheduler 26 may comprise a hardware device or software application or combination thereof executing within CMTS 14 to facilitate spectrum sharing by cable modems 16. In other embodiments, intelligent MAC scheduler 26 may comprise a hardware device or software application executing outside CMTS 14, for example, in a separate appliance (e.g., fiber coaxial unit (FCU) access node, etc.), server, or other network element and coupled to (e.g., connected to, in communication with, etc.) CMTS 14 in cable network 12.

Transceivers 18 may comprise suitable hardware components and interfaces for facilitating the operations described herein. In some embodiments, transceivers 18 may be embedded in or be part of another hardware component, such as a broadband processing engine comprising a motherboard, microprocessors and other hardware components. In some embodiments, transceivers 18 comprise downstream and upstream PHY modules, deployed in a Coaxial Media Converter (CMC) that supports RF functions at the PHY layer. Transceivers 18 may comprise pluggable modules (e.g., small form-factor pluggable (SFP)) that may be plugged into a network element chassis, or embedded modules that attach to cables directly. In addition to optical and electrical interfaces, transceivers 18 include a PHY chip, appropriate digital signal processors (DSPs) and application specific integrated circuits (ASICs) according to particular needs. In various embodiments, the DSPs in transceivers 18 may be adapted (e.g., programmed) to perform appropriate interference cancellation as described herein to enable full duplex communication.

Amplifiers 20 comprise RF amplifiers suitable for use in cable network 12. Amplifiers 20 are typically used at intervals in network 12 to overcome cable attenuation and passive losses of electrical signals caused by various factors (e.g., splitting or tapping the coaxial cable). Amplifiers 20 may include trunk amplifiers, distribution amplifiers, line extenders, house amplifier and any other suitable type of amplifier used in cable networks. According to various embodiments, substantially all amplifiers 20 are configured suitably as described herein to facilitate full duplex communication.

Figure 2:
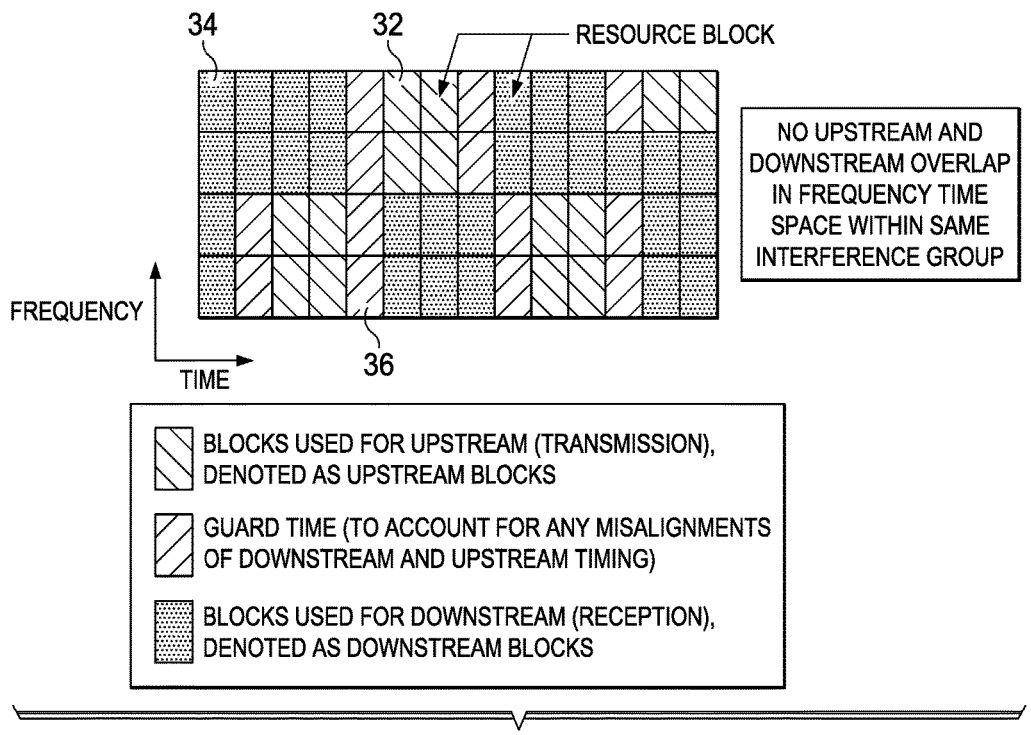
FIG. 2 is a simplified block diagram illustrating other example details of embodiments of the communication system.

Turning to FIG. 2, FIG. 2 is a simplified diagram illustrating example details of frequency planning by MAC scheduler 26 according to an example embodiment of communication system 10. Various frequency ranges used by cable modems 16 in any one of interference groups 30 may be divided in time into resource blocks, such as upstream resource blocks 32, downstream resource blocks 34 and guard time resource blocks 36. In a general sense, the time and frequency employed to transmit an amount of data may be grouped as a resource block. In some embodiments, each resource block may comprise 8 or 16 symbols in time, and 1 subcarrier in frequency. The frequency division aligns with channel boundaries in some embodiments. In other embodiments, the frequency division has finer granularities, such as corresponding to groups of subcarriers for DOCSIS 3.1. The time division aligns with frame boundaries in some embodiments. In other embodiments, the time division aligns with mini-slots boundaries. In various embodiments, upstream resource blocks 32 and downstream resource blocks 34 in the relevant interference group do not synchronize on the time division boundaries; there is no overlap between upstream transmission and downstream receptions in frequency-time space within the same interference group.

In some embodiments, a centric scheduler algorithm may be used to achieve T-R coordination with the described resource allocation scheme. Other embodiments use a distributed scheduler algorithm for T-R coordination. With the centric scheduler algorithm, the resource scheduling in time and frequency is done centrally, for example, with MAC scheduler 26 in CMTS 14. In the distributed scheduler algorithm, the upstream scheduling is done mainly by cable modems 16 through a contention scheme. CMTS 14 assists the upstream scheduling by policing resource usage by cable modems 16 to avoid the collision. In other words, it is a contention based upstream scheduling with collision avoidance. The distributed scheduler algorithm is similar in some ways to the centric scheduler algorithm, in that the distributed algorithm divides the available bandwidth into resource blocks, and follows the rule of no overlapping of downstream resource blocks 34 and upstream resource blocks 32 within any one of interference groups 30.

A simplex bi-directional signaling channel is established between CMTS 14 and cable modems 16 to exchange scheduling information. CMTS 14 broadcasts the downstream resource block allocation information comprising a downstream media access protocol (MAP) message to cable modems 16 in the signaling channel ahead of the actual allocation time. Cable modems 16 listen to the downstream MAP in the signaling channel. Based on the downstream MAP, cable modems 16 sort out upstream resource blocks 32 available for upstream transmission. In various embodiments, a specific downstream MAP message may be applicable to (e.g., correspond with) a particular one of interference groups 30. Based on queue depth (e.g., amount of data queued to be transmitted), cable modems 16 reserve upstream resource blocks 32 by sending a reservation notice to CMTS 14. CMTS 14 echoes the cable modems' reservations in a downstream signaling channel with time stamps. Each of cable modems 16 receives an echo of its own reservation and reservation of other cable modems 16, with time stamps. The specific one of cable modems 16 with the earliest time stamp for its reservation may seize upstream resource blocks 32 and start transmitting.

The downstream and upstream scheduling are not independent of each other. For a specific one of cable modems 16, MAC scheduler 26 may schedule its upstream transmission in certain upstream resource blocks 32; further, MAC scheduler 26 may ensure that other cable modems 16 from the same interference group receive their downstream receptions in downstream resource blocks 34 that do not overlap with scheduled upstream resource blocks 32 of the specific one of cable modems 16. Likewise, for the specific one of cable modems 16, MAC scheduler 26 may schedule its downstream reception in certain downstream resource blocks 34; further, MAC scheduler 26 may ensure that other cable modems 16 from the same interference group transmit upstream in upstream resource blocks 32 that do not overlap with the scheduled downstream resource blocks 34. Multicast and broadcast messages may be scheduled on specific resource blocks without upstream transmission from any cable modems 16. In the case of broadcast video, a block of downstream spectrum (e.g., frequency range) may be allocated for broadcast video, and the corresponding upstream spectrum may be idled to avoid interference to video at cable modems 16.

Figure 3:
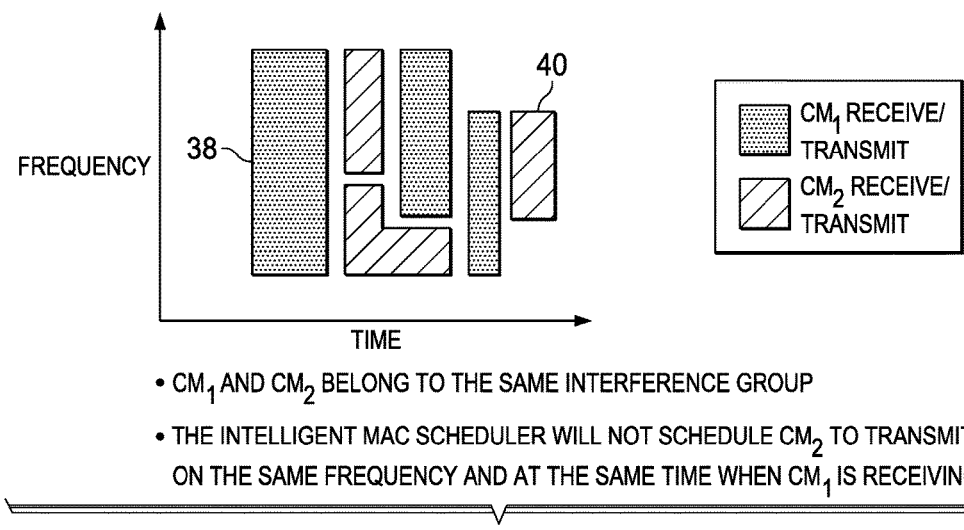
FIG. 3 is a simplified block diagram illustrating yet other example details of embodiments of the communication system.

Turning to FIG. 3, FIG. 3 is a simplified diagram illustrating example details of T-R coordination according to an embodiment of communication system 10. Consider T-R coordination among two CMs, $CM_1$ and $CM_2$ in a particular one of interference groups 30 in cable network 12. MAC scheduler 26 may allocate resource blocks 38 to $CM_1$ and resource blocks 40 to $CM_2$. Note that for ease of illustration, upstream resource blocks and downstream resource blocks comprised in resource blocks 38 and 40 are not explicitly shown. MAC scheduler 26 will not schedule $CM_2$ to transmit upstream on the same frequency at the same time when $CM_1$ is receiving downstream. In other words, $CM_1$ and $CM_2$ do not have overlapping resource blocks for upstream transmission or downstream reception. Such pairwise relationship holds for any pair of cable modems 16 in any one of interference groups 30.

Figure 4:
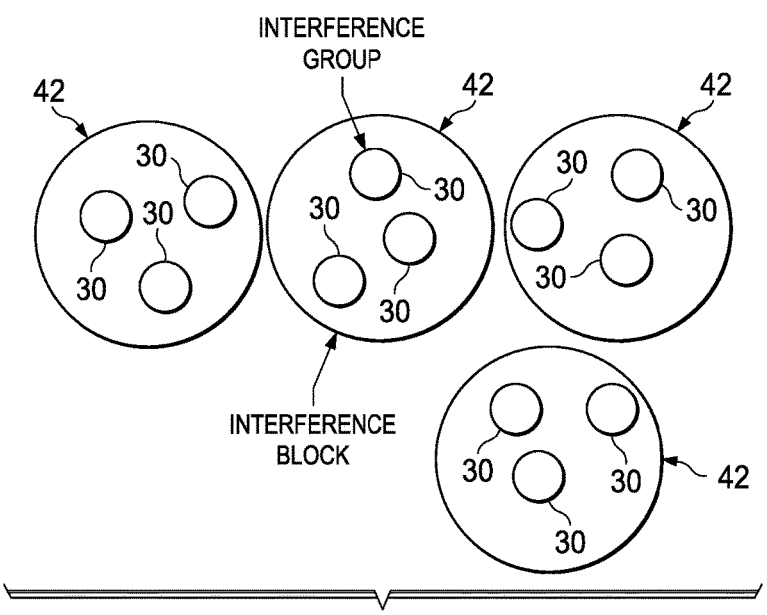
FIG. 4 is a simplified block diagram illustrating yet other example details of embodiments of the communication system.

Turning to FIG. 4, FIG. 4 is a simplified block diagram illustrating example details of an embodiment of communication system 10. In some embodiments, MAC scheduler 26 may operate centrally in cable network 12, implementing T-R coordination centrally, for example, at CMTS 14. MAC scheduler 26 categorizes cable modems 16 into interference groups 30, and schedules upstream transmissions and downstream receptions for cable modems 16 in each interference group 30, such that no cable modem of any one interference group transmits upstream in a frequency range simultaneously as another cable modem in the same interference group receives downstream in the frequency range. The scheduling can allow cable modems 16 in different interference groups 30 to transmit upstream and receive downstream simultaneously in the frequency range. MAC scheduler 26 generates scheduling information of the scheduling. The scheduling information may be comprised in appropriate MAC control messages in some embodiments. MAC scheduler 26 transmits the scheduling information to cable modems 16.

In various embodiments, downstream reception time is interleaved in a zig zag pattern such that downstream data spans multiple symbols overlapped with each other. In a general sense, "interleaving" refers to spreading data over some parameter; data spread over time is referred to as time interleaved data; data spread over frequency is referred to as frequency interleaved data. For example, data comprised in one symbol before interleaving is spread across 32 symbols after interleaving. Note that the term "symbol" has the general meaning familiar to persons with ordinary skill in the art and refers to a time interval for communicating bits of data that are modulated onto carriers at certain frequencies according to the modulation scheme used for the communication (e.g., in a single carrier modulation scheme, as higher data rates are used, the duration of one symbol becomes smaller); data is coded into the frequency domain one symbol at a time. In other words, data is carried in communication channels in cable network 12 in units of symbols in the time domain and frequency sub-carriers in the frequency domain.

Prior to interleaving, subsequent symbols containing downstream data are not overlapped; after interleaving, the downstream data spans multiple symbols and is effectively overlapped with itself. In an example, a packet of data that fits into one or two symbols occupies 32 symbols after interleaving. In various embodiments, upstream transmission time is not interleaved. In various embodiments, downstream transmission frequency is interleaved across a downstream symbol spanning a frequency range of an orthogonal frequency division multiplex (OFDM) resource block (e.g., 192 MHz) (and not the entire frequency spectrum available for cable network 12). Upstream transmission frequency is interleaved across an upstream symbol. The upstream symbol is aligned with the downstream symbol.

To facilitate interleaving in the time and frequency domain, interference groups 30 may be further sorted into interference blocks (IBs) 42. Each interference block 42 comprises a plurality of symbols including a symbol for guard time, with interleaving being implemented using interference blocks 42. In some embodiments, cable modems 16 may be sorted into interference groups 30 at initialization using a special ranging process. Interference groups 30 are sorted into interference blocks 42. Note that interference blocks 42 can comprise any suitable (e.g., convenient, appropriate) grouping of interference groups 30. In an example embodiment, interference blocks 42 may be designated by small letters a, b, c, d, for example, to distinguish them from DOCSIS 3.1 profile designations of capital letters A, B, C, D. In an example embodiment, any one interference block 42 may equal 32 symbols (comprising the interleaved symbols) and one additional symbol for guard time, totaling 33 symbols in all. The guard time symbol may not be a dedicated symbol, but may be conveniently chosen based on the data pattern or other parameters as appropriate.

In some embodiments, a number (e.g., 100) of interference groups 30 may be mapped to a relatively much smaller number (e.g., 4) of interference blocks 42. In other embodiments, a number of interference groups 30 (e.g., 100) may be mapped to an equal or similar order of magnitude number of interference blocks 42 (e.g., 100 or 50). In the latter embodiments, each interference block 42 may serve as a guard time in downstream transmissions from CMTS 14 to cable modems 16. The upstream transmissions would ignore 3× interference block times (e.g., first interference block time during which it is supposed to receive downstream data, and two other interference blocks on either side of the first interference block time). With dynamic assignment of interference groups 30 to interference blocks 42, each interference group 30 can get 97% of the spectrum between downstream reception and upstream transmission. In a general sense, delay and timing differences within any one of interference groups 30 can be accommodated with a one symbol guard time, whereas delay and timing differences between CMTS 14 and interference groups 30 may be accommodated with additional guard time.

Figure 5:
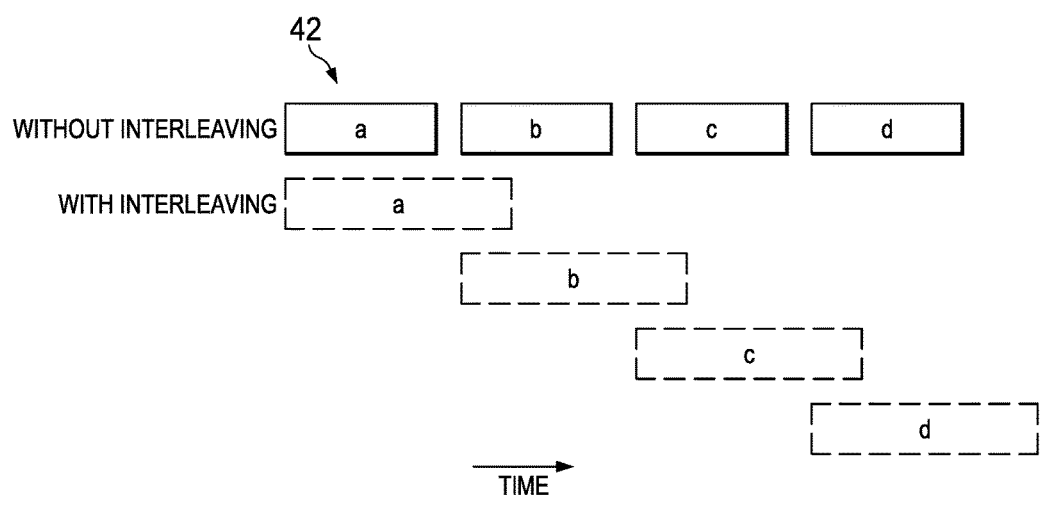
FIG. 5 is a simplified block diagram illustrating yet other example details of embodiments of the communication system.

Turning to FIG. 5, FIG. 5 is a simplified block diagram illustrating example details according to an embodiment of communication system 10. Consider an example transmission comprising four interference blocks 42. In other words, interference groups 30 are categorized into 4 interference blocks 42 (e.g., 100 interference groups map to 4 interference blocks), namely, a, b, c, and d. Without time interleaving, interference blocks a, b, c, d may be stacked one after the other in a repeating pattern. With time interleaving, interference blocks a, b, c, and d may overlap with each other in time according to the extent of interleaving. In some embodiments, time offset may also be implemented, for example, with the next set of interference blocks 42 being some time apart from the previous set of interference blocks 42, for example, to account for time delays and other factors. Such time offset may include guard times to account for delays among cable modems 16, between CMTS 14 and cable modems 16, etc.

Figure 6:
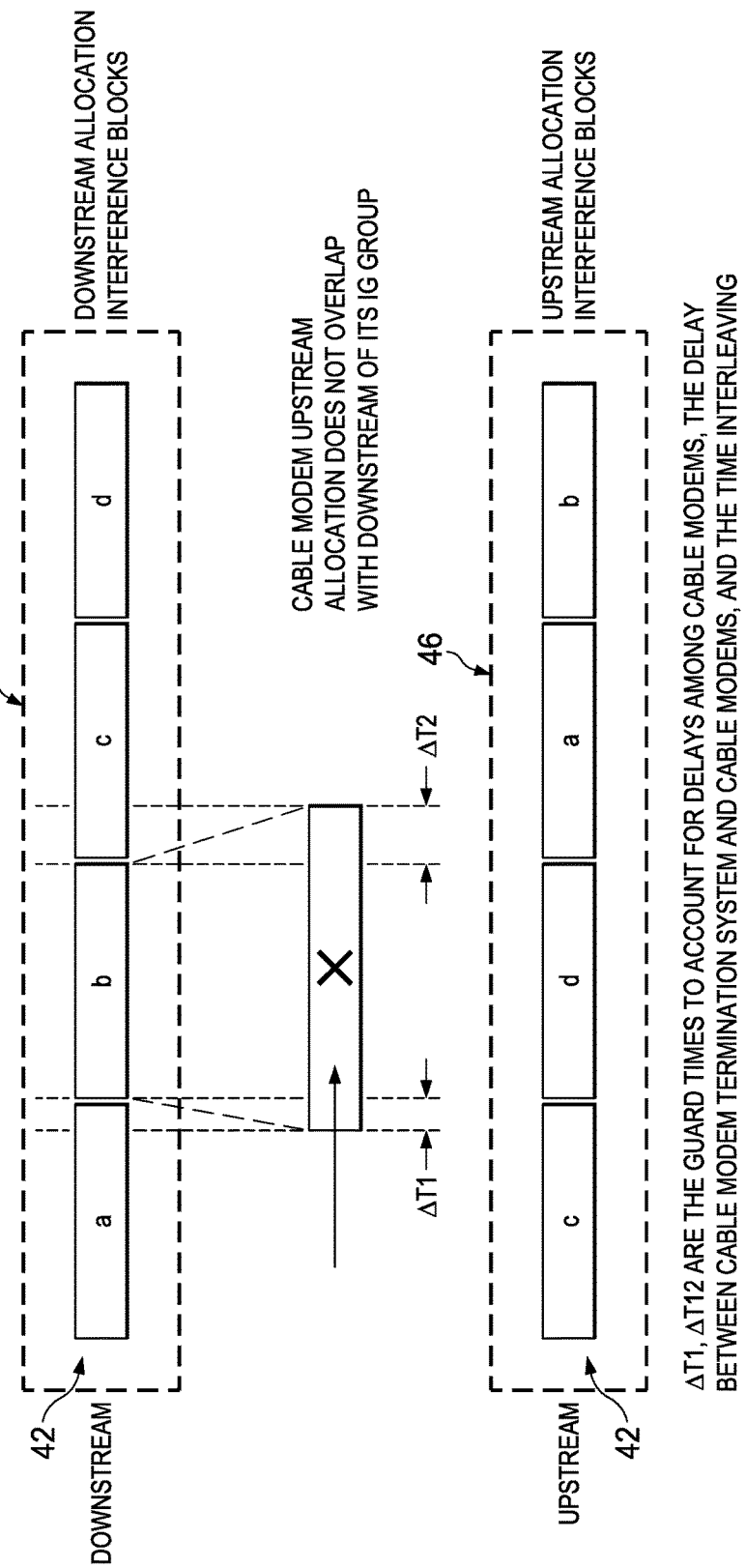
FIG. 6 is a simplified block diagram illustrating yet other example details of embodiments of the communication system.

Turning to FIG. 6, FIG. 6 is a simplified block diagram illustrating example details according to an embodiment of communication system 10. In non-full-duplex cable networks, a cyclic prefix (CP) is different for the downstream symbol and the upstream symbol because they are at different frequencies. However, with full duplex communication, the downstream symbol and upstream symbol can be at the same frequency. In various embodiments, the CP is the same for a particular frequency, regardless of the direction (e.g., upstream or downstream) of transmission, facilitating alignment of downstream and upstream symbols per OFDM resource block. In some embodiments, the time-space alignment of downstream symbols with upstream symbols can be represented figuratively by trapezoids in the downstream lining up with rectangles in the upstream direction. The "bottom" side of the trapezoid would be different in length from the "top" side depending on the amount of time interleaving. In such a figurative representation, the top of the downstream trapezoid would be zero interleaved and can be considered a reference point.

Consider an example transmission comprising four interference blocks 42. In other words, interference groups 30 are categorized into 4 interference blocks 42 (e.g., 100 interference groups map to 4 interference blocks), namely, a, b, c, and d. In such example embodiments, if all interference blocks 42 are of equal bandwidth, then each interference group 30 is only getting 25% of the frequency spectrum.

Each interference block 42 is 33 symbols wide in this example. Assume that interference blocks 42 allocated for downstream transmission are referred to as downstream blocks 44 in pattern a-b-c-d-repeat; interference blocks 42 allocated for upstream transmission are referred to as upstream blocks 46 in pattern c-d-a-b-repeat. Downstream blocks 44 could be lined up with the upstream blocks 46 with an offset of 2 blocks. The gap between blocks a and c is the guard time (comprising blocks b and d). The guard time is at least 32 symbols wide to accommodate downstream frequency interleaving. An extra symbol is included to allow for time differences within an interference group for a total of 33 symbols.

Figure 7:
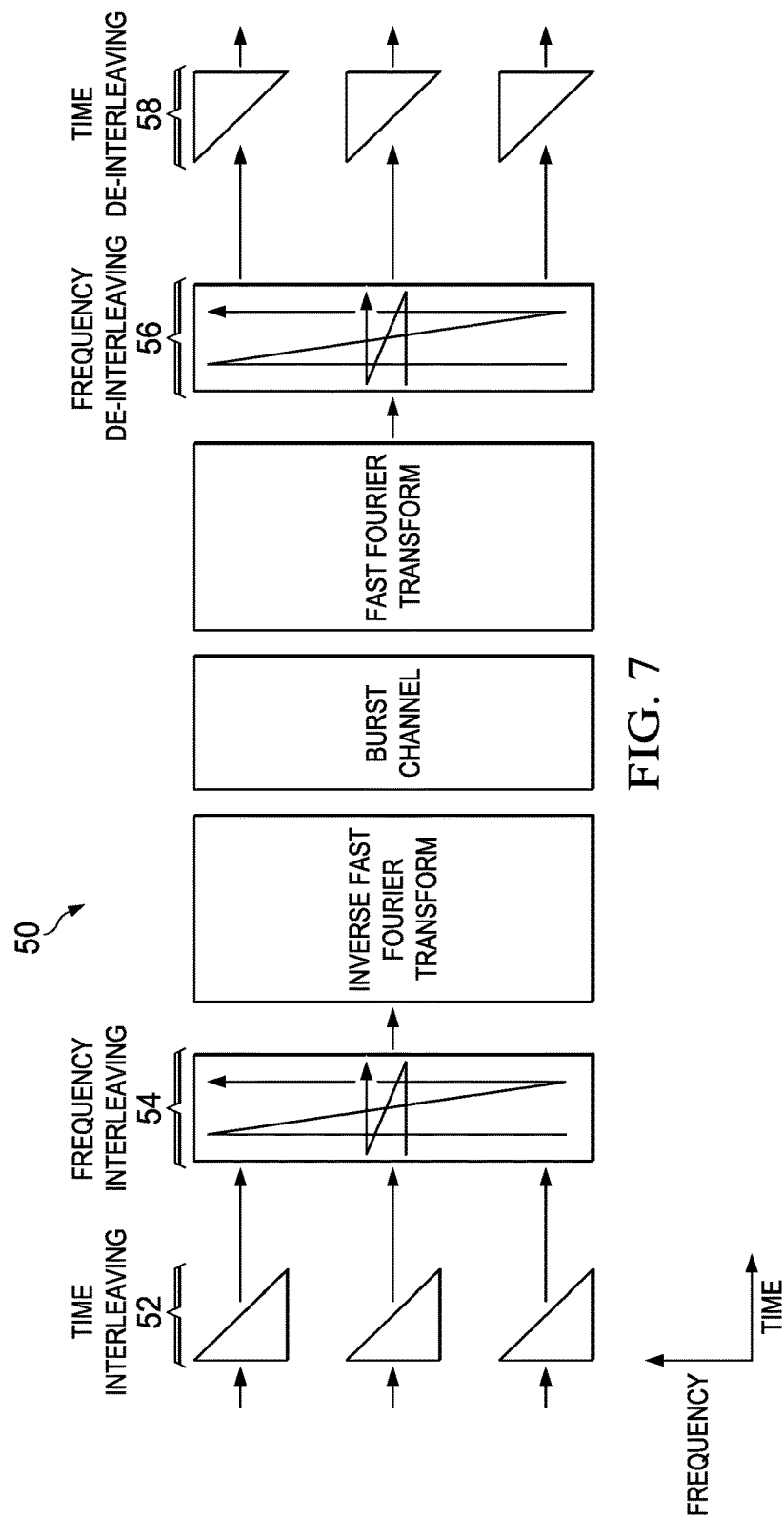
FIG. 7 is a simplified block diagram illustrating yet other example details of embodiments of the communication system.

Turning to FIG. 7, FIG. 7 is a simplified block diagram illustrating example details according to an embodiment of communication system 10. In a general sense, when a time domain interleaving scheme is typically implemented at the symbol level, different carriers of the OFDM symbol are delayed by different amounts. As the carrier allocation is along frequency, the interleaving in time will be effective for burst interferences; the interferences will be spread across the symbols in time axis, into multiple forward error correction (FEC) blocks. In the case where the burst interference covers many sub-carriers, the interleaving depth is large enough to minimize the numbers of interfered sub-carriers for each FEC block. However, time interleaving introduces delay, which equals the interleaving depth.

According to some embodiments, interleaving 50 takes advantage of the multiple FEC blocks along frequency at each symbol. Time interleaving 52 is performed on the symbols, and frequency interleaving 54 is added to time interleaving 52, for example, to achieve better interleaving efficiency with minimized delay. Accordingly, symbols at each symbol time are re-arranged through a simple storage access scheme without introducing any delay. With addition of frequency interleaving 54 to time interleaving 52, effective interleaving depth is a product of frequency interleaving depth and time interleaving depth. Interleaved data is subjected to Inverse Fast Fourier Transform (IFFT) and sent across a burst channel. At the receiver, the received data is subjected to Fast Fourier Transform (FFT) and frequency de-interleaving 56, followed by time de-interleaving 58.

Figure 8:
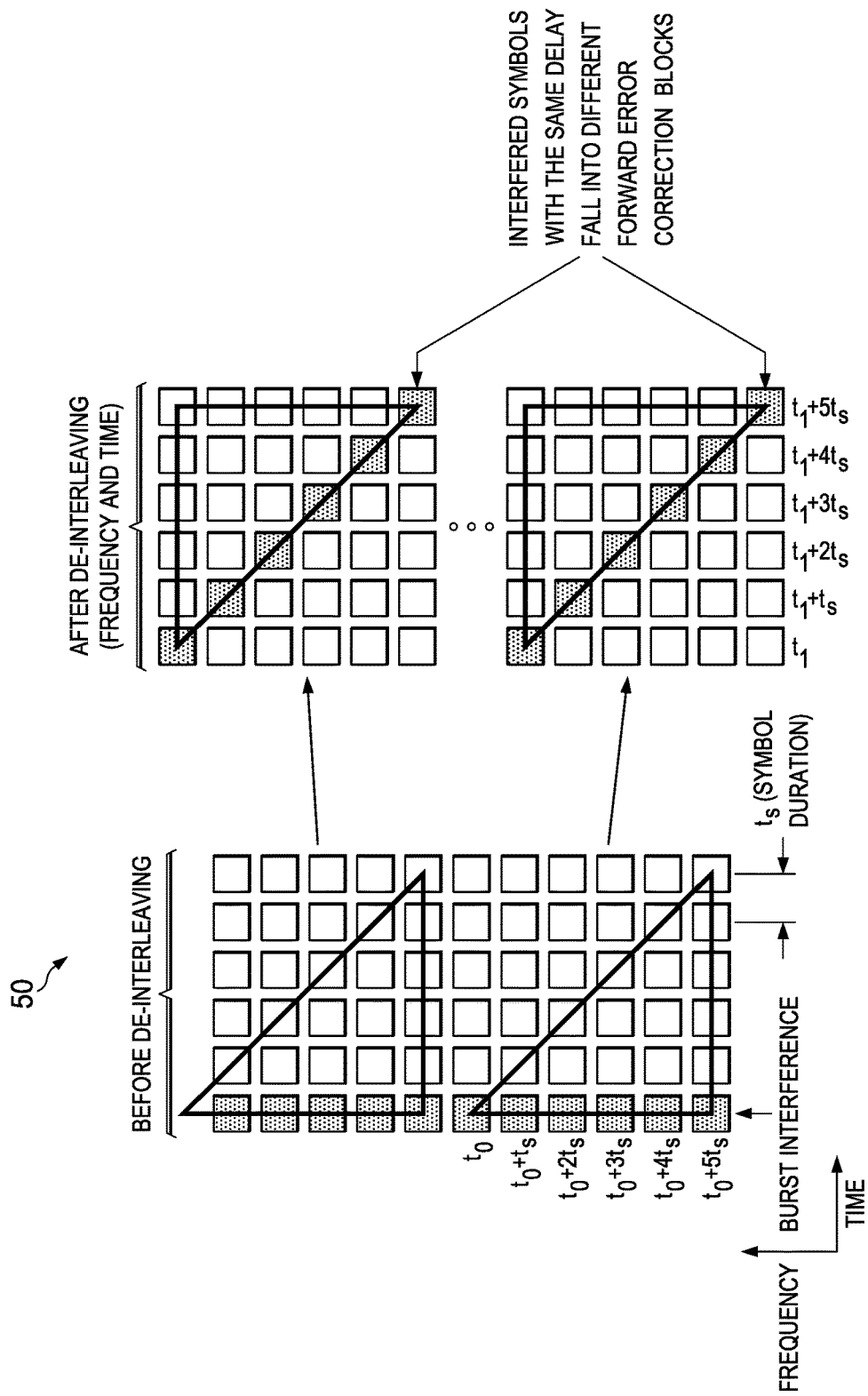
FIG. 8 is a simplified block diagram illustrating yet other example details of embodiments of the communication system.

Turning to FIG. 8, FIG. 8 is a simplified block diagram illustrating example details according to an embodiment of communication system 10. According to the embodiments interleaving 50, in which time interleaving 52 is added to frequency interleaving 54, interferences fall into different FEC blocks after de-interleaving even with shallow interleaving depth along time, leading to enhanced interleaving performance with a minimum delay.

Figure 9:
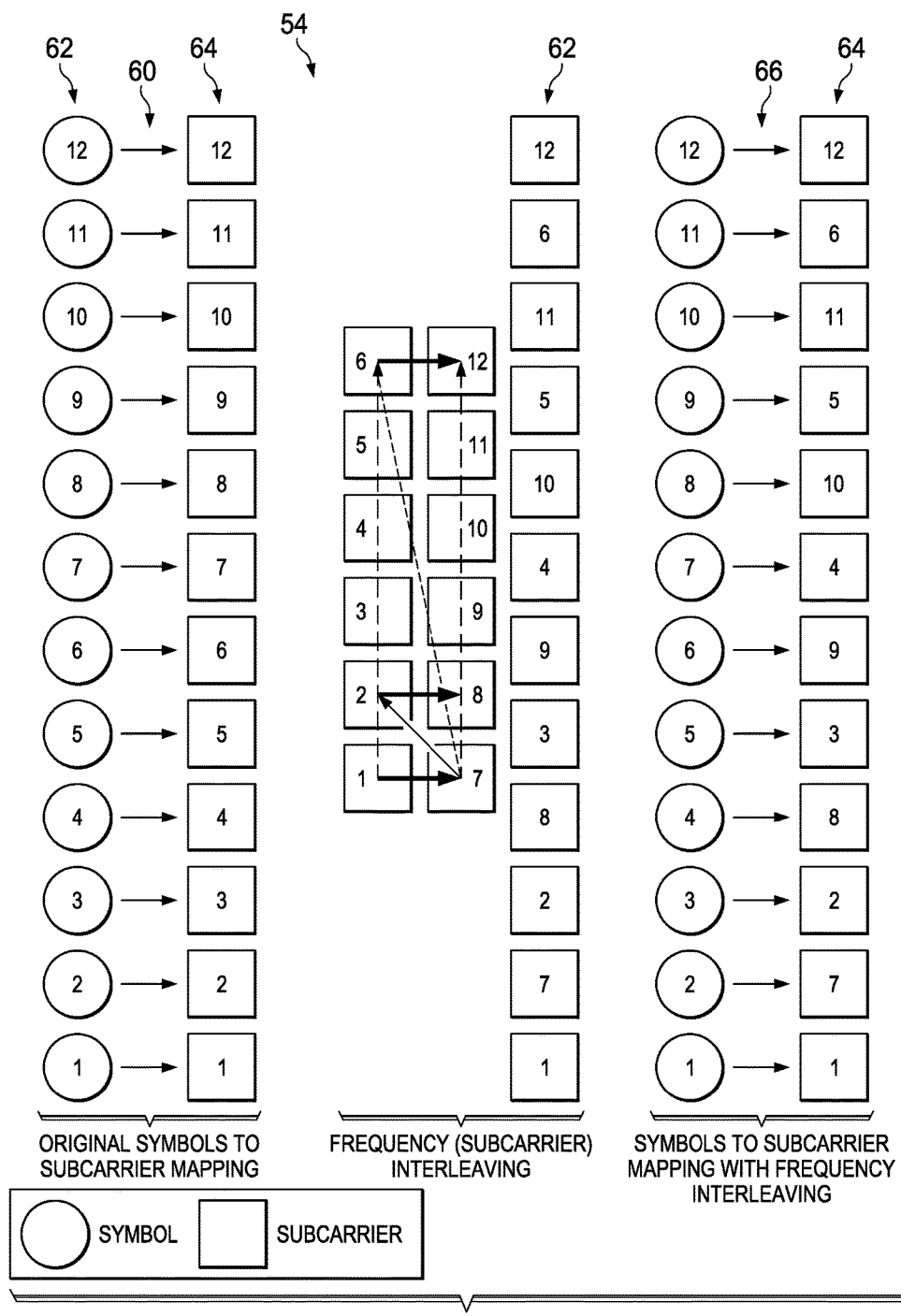
FIG. 9 is a simplified block diagram illustrating yet other example details of embodiments of the communication system.

Turning to FIG. 9, FIG. 9 is a simplified block diagram illustrating example details of frequency interleaving 54 according to an embodiment of communication system 10. Consider a hypothetical example comprising a mapping 60 between symbols 62 and sub-carriers 64. Twelve symbols 62 are mapped to corresponding twelve sub-carriers 64 in mapping 60. According to frequency interleaving 54, sub-carriers 64 are arranged into two columns and are ordered in an ascending order along each of the columns (e.g., 1-6 in column 1 and 7-12 in column 2). Sub-carriers 64 are re-ordered by reading the rows of the two columns in an ascending order (e.g., bottom to top). The final order of sub-carriers 64 after frequency interleaving 54 is no longer in a purely ascending order. Final mapping 66 between symbols 62 and sub-carriers 64 is different from mapping 60 before frequency interleaving 54.

Figure 10:
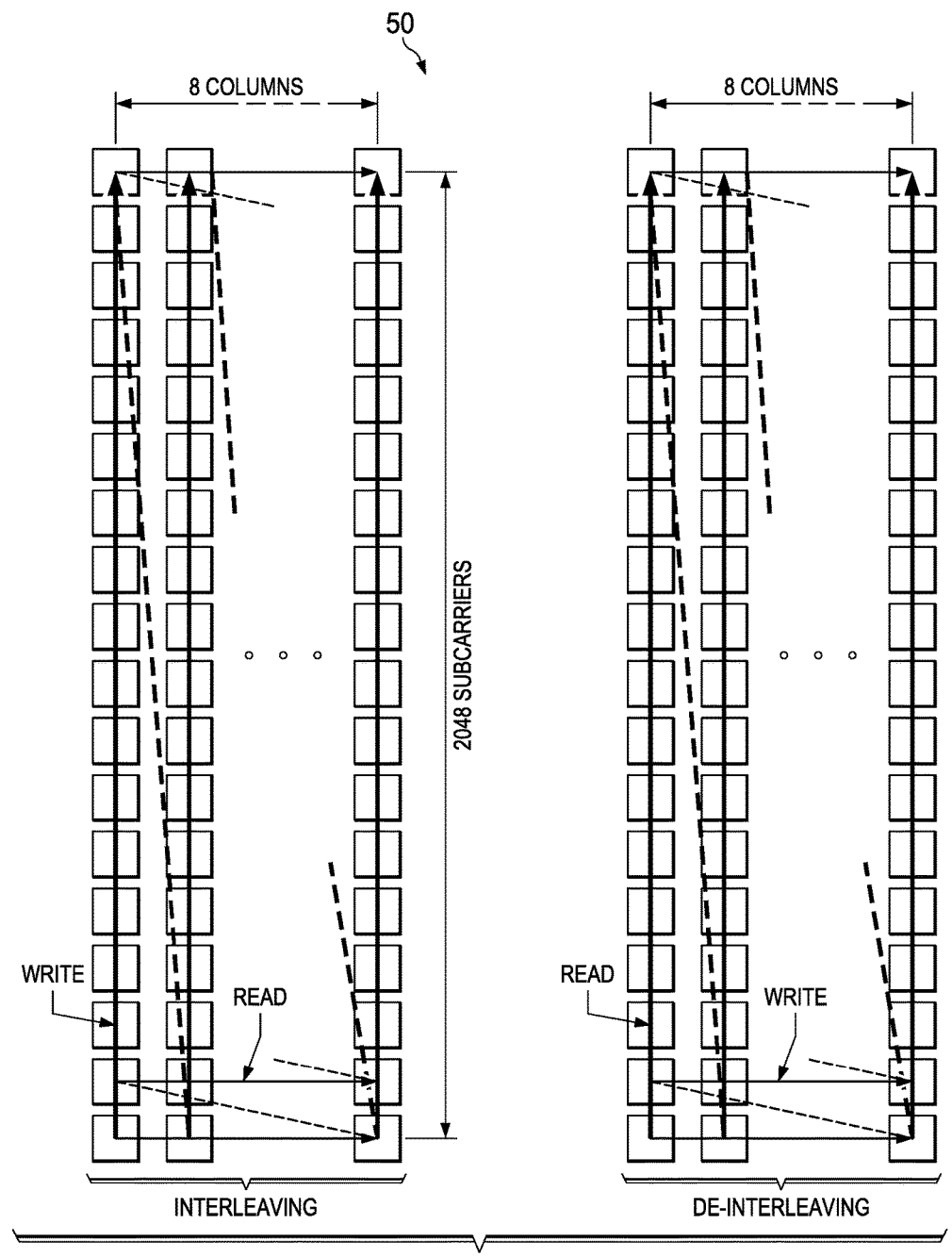
FIG. 10 is a simplified block diagram illustrating yet other example details of embodiments of the communication system.

Turning to FIG. 10, FIG. 10 is a simplified block diagram illustrating example details of interleaving 50 according to an embodiment of communication system 10. To explain further, consider an example with 16384 sub-carriers (192 MHz, 12.5 kHz CS). The 16384 sub-carriers are arranged into 8 columns, each column having 2048 sub-carriers. With 16200 bit-density parity-check (LDPC) and 256-Quadrature amplitude modulation (QAM), each column has one FEC codeword (CW). At the interleaving stage, mapping between symbols and sub-carrier is such a way that the symbols are written along columns, and read out along rows. At the de-interleaving stage, symbols are written along rows, and read out along columns.

Figure 11:
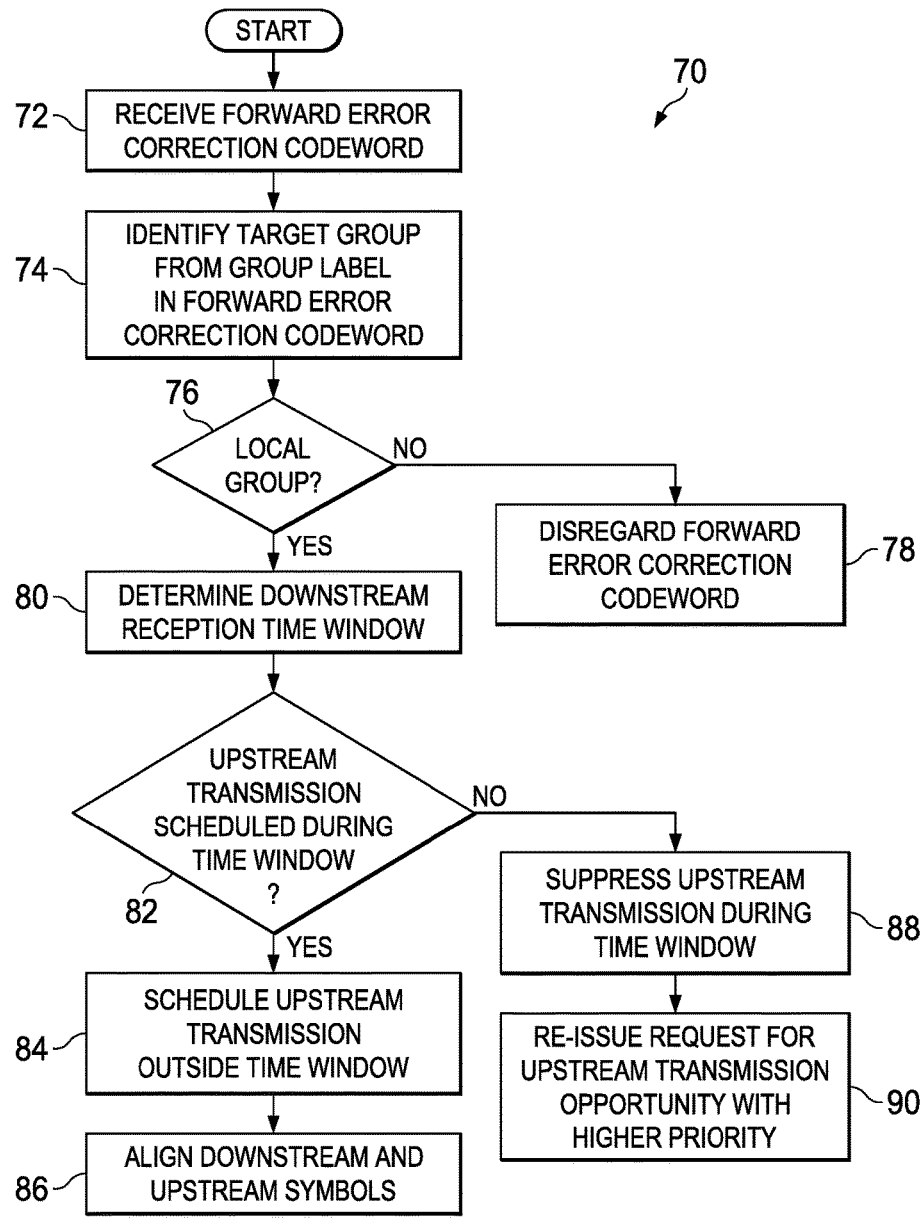
FIG. 11 is a simplified flow diagram illustrating example operations that may be associated with an embodiment of the communication system.

Turning to FIG. 11, FIG. 11 is a simplified flow diagram illustrating example operations 70 according to an embodiment of communication system 10. Operations 70 may be assumed to be executed at a specific one of cable modems 16. In some embodiments, a distributed intelligent scheduling scheme is implemented by MAC scheduler 26 for T-R coordination, for example, to make the scheduling scheme more scalable. The distributed intelligent scheduling is enforced by cable modems 16 and is not centrally enforced at CMTS 14. The distributed scheduling scheme keeps the downstream and upstream scheduling asynchronous with each other.

In general, according to the distributed scheduling scheme, cable modems 16 are divided into a large number of interference groups 30, each having a relatively small number of cable modems 16. Interference groups 30 are established with a ranging process. Downstream transmission in a frequency range from CMTS 14 to cable modems 16 is implemented in one or more transmission units, such as FEC CW. Each FEC CW includes a group label identifying the specific interference group that is receiving data for that FEC CW, distinguishing the downstream transmission in the frequency range to the interference group from downstream transmissions to other interference group. In an example embodiment, the FEC CW group label may be included in a FEC next codeword pointer field (NCP) according to DOCSIS 3.1 standards. At 72, the cable modem executing operations 70 receive the FEC CW. At 74, it identifies the target interference group from the group label in the FEC CW. At 76, a determination is made whether the target interference group is the same as the local interference group to which the cable modem belongs. If the local interference group is not the target interference group, the FEC CW (and subsequent downstream transmission) may be disregarded at 78.

If the local interference group is the target interference group, the cable modem determines the downstream reception time window at 80. The group label in the FEC CW is several CW times in advance or in a separate structure so that the cable modem in the target interference group can anticipate receiving the downstream data ahead of actual reception, and schedule upstream transmission accordingly. At 82, the cable modem makes a determination whether it has scheduled any upstream transmission during the anticipated time window. According to various embodiments, cable modems 16 in the target interference group receiving the FEC CW are not allowed to transmit upstream. Because cable modems 16 request bandwidth ahead of time of upstream transmission, some cable modems 16 may have received a grant during the time window of downstream transmission. (CMTS 14 is not enforcing scheduling restrictions, and freely issues grants.) Thus, the determination at 82 may include identifying any grants available for use during the anticipated time window.

If no upstream transmission is scheduled, at 84, the cable modem schedules upstream transmission outside the anticipated time window (e.g., prior to, or after, the anticipated time window). At 86, the cable modem associates minislots or symbols times in upstream transmissions with minislots or symbols in downstream receptions, aligning upstream and downstream symbols. On the other hand, if upstream transmission is scheduled, at 88, the cable modem suppresses upstream transmission during the anticipated time window, forfeiting the upstream transmission opportunity. At 90, the forfeiture can be managed by re-issuing requests to CMTS 14 with higher priority. In some embodiments, CMTS 14 may poll target cable modems to which it is sending downstream transmissions to check on suppressed transmissions.

In some embodiments, downstream bandwidth per cable modem being limited, downstream bandwidth per interference group can be rate-limited in a hierarchical manner to prevent upstream transmissions from being locked out. Embodiments of communication system 10 may not require any downstream and upstream calibration and alignment at CMTS 14. Long guard times may also be unnecessary, for example, due to large serving area sizes. The reference is local to the cable modems 16 that are close enough to impact each other. In various embodiments, cable modems 16 are "warned" ahead of time of downstream transmission of data and can suppress upstream transmission accordingly.

Each one of interference groups 30 becomes a simplex group in which transmission occurs in one direction at a time. Because the sizes (e.g., memberships) of interference groups 30 are small and there are many of them, the overall effect in cable network 12 is full duplex communication. In various embodiments, any one cable modem has an aggregate bandwidth equal to one copy of the full spectrum. The overall interference group on a node has an aggregate bandwidth equal to two times the spectrum.

In some embodiments that include the distributed intelligent scheduling, a first interference group predicts that a particular frequency range is not going to be used for upstream transmission by a second interference group and hijacks the frequency range for its own upstream transmission. Prediction may be based upon traffic to one or more cable modems in the second interference group, priorities of traffic or devices, back-up list information from CMTS 14, set of contention REQ slots, or other suitable parameters.

Figure 12:
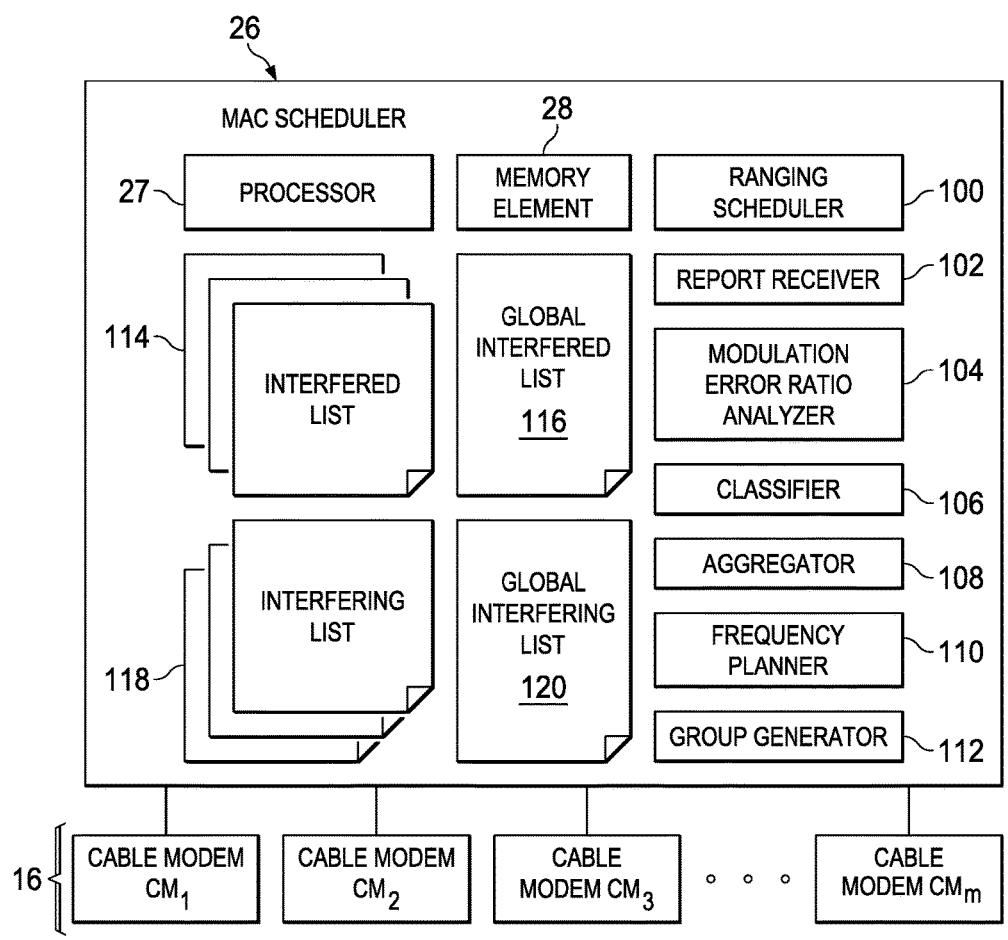
FIG. 12 is a simplified block diagram illustrating yet other example details of embodiments of the communication system.

Turning to FIG. 12, FIG. 12 is a simplified block diagram showing example details of MAC scheduler 26 according to embodiments of communication system 10. MAC scheduler 26 includes a ranging scheduler 100, a report receiver 102, a MER analyzer 104, a classifier 106, an aggregator 108, a frequency planner 110, and a group generator 112. Memory element 28 may store various data, including one or more interfered list 114, a global interfered list 116, one or more interfering list 118, and a global interfering list 120.

During frequency planning and grouping, MAC scheduler 26 may generate, for a particular one of cable modems 16 (say $CM_1$) in cable network 12, interfered list 114 associated with a frequency range. Interfered list 114 comprises a first list of cable modems 16 whose downstream reception in the frequency range is interfered by upstream transmissions of cable modem $CM_1$ in the frequency range. Assume, merely for example purposes, that the first list of cable modems comprises cable modems $CM_2$ and $CM_3$. In other words, interfered list 114 for $CM_1$ comprises $CM_2$ and $CM_3$. MAC scheduler 26 may repeat the interfered list generating process for other cable modems 16 (e.g., $CM_1$ . . . $CM_m$) in cable network 12. For example, interfered list 114 for $CM_2$ may comprise $CM_2$ and $CM_m$; interfered list 114 for $CM_3$ may comprise $CM_1$ . . . $CM_m$; etc.

The interfered list generating process is repeated for other frequency ranges in the frequency spectrum used in cable network 12. For example, the frequency spectrum may be divided into n frequency ranges (e.g., F(1) to F(n)), and the interfered list generating process may be repeated for each one of the n frequency ranges, with separate interfered lists 114 being generated for each frequency range and each cable modem in cable network 12. Aggregator 108 may aggregate the generated interfered lists into global interfered list 116.

MAC scheduler 26 may further generate, for one of cable modems 16, say $CM_1$, interfering list 118 associated with the frequency range. Interfering list 118 comprises a second list of cable modems whose upstream transmissions in the frequency range interfere with downstream reception of cable modem $CM_1$ in the frequency range. Assume, merely for example purposes, that the second list of cable modems comprises cable modems $CM_2$ . . . $CM_m$. In other words, interfering list 118 for $CM_1$ comprises $CM_2$, $CM_3$, . . . $CM_m$. MAC scheduler 26 may repeat the interfering list generating process for other cable modems 16 (e.g., $CM_1$ . . . $CM_m$) in cable network 12. For example, interfering list 118 for $CM_2$ may comprise $CM_1$ and $CM_3$; interfering list 118 for $CM_3$ may comprise $CM_2$; etc. The interfering list generating process is repeated for other frequency ranges F(1)-F(n) in the frequency spectrum used in cable network 12. Aggregator 108 may aggregate the generated interfering lists into global interfering list 120.

In various embodiments, to generate interfered list 114 for cable modem $CM_1$ for a particular frequency range, say F(1), ranging scheduler 100 schedules cable modem $CM_1$ to transmit a ranging signal within the frequency range F(1) during a maintenance window (e.g., initial ranging window; contention window; etc.). Report receiver 102 receives reports indicative of interferences on respective downstream reception at the frequency from other cable modems $CM_2$ . . . $CM_m$ in cable network 12. The reports include MER values. MER analyzer 104 analyzes the received reports and identifies cable modems $CM_2$ and $CM_3$ that are interfered by the transmitting cable modem $CM_1$ based on the reports. The identification may be based on the value of MER exceeding a predetermined threshold (either absolute or relative). For example, $CM_2$ and $CM_3$ may have reported the highest MER values among cable modems $CM_2$ . . . $CM_m$. Classifier 106 adds the identified cable modems $CM_2$ and $CM_3$ to the first list and into interfered list 114 for the cable modem $CM_1$.

In various embodiments, generating interfering list 118 for the cable modem $CM_1$ (and other cable modems 16) comprises deriving the second list of cable modems from global interfered list 116. For example, for cable modem $CM_1$ and each frequency range, from global interfered list 116, classifier 106 looks up the cable modems that interfere with the cable modem $CM_1$ on that frequency range. The interfering cable modems are entered as entries for the cable modem $CM_1$ on that frequency range in corresponding interfering list 118. In various embodiments, interfering list 118 and interfered list 114 are not updated often; they may be updated when changes are made to cable network 12, for example, additional cable modems are added, or existing cable modems are removed.

Frequency planner 110 assigns respective downstream reception frequency ranges and upstream transmission frequency ranges for cable modems 16 ($CM_1 \ldots CM_m$) based on global interfered list 116 and global interfering list 120. For example, $CM_1$ may be assigned downstream reception frequency range F(1) and upstream transmission frequency range F(3); $CM_2$ may be assigned downstream reception frequency range F(3) and upstream transmission frequency range F(n); and so on. In various embodiments, the assigning is on a first-come-first serve basis. For example, downstream reception frequency range may be selected from among the frequency ranges and assigned to the first available (e.g., recognized, identified, listed, sorted, etc.) unassigned cable modem to the exclusion of other cable modems based on global interfered list 116 and global interfering list 120.

The assigning may be based on un-aggregated lists alternatively in some embodiments. Note that the aggregation operation is merely for convenience and may be skipped without departing from the scope of the embodiments. MAC scheduler 26 transmits to cable modems 16 ($CM_1 \ldots CM_m$) corresponding assignment information comprising the respective assigned downstream reception frequency ranges and upstream transmission frequency ranges.

In some embodiments, group generator 112 groups cable modems 16 into interference groups 30, each interference group being isolated on frequency basis from other interference groups, with cable modems in each group being assigned a common downstream reception frequency range and a common upstream transmission frequency range. For example, cable modems $CM_1$, $CM_2$ and $CM_3$ may be assigned to group A. Cable modems $CM_1$, $CM_2$ and $CM_3$ may be assigned a common downstream reception frequency range of F(1) and a common upstream transmission frequency range of F(2). In some embodiments, the grouping is based on interfered list 114. For example, the cable modem $CM_1$ is grouped with the first list of cable modems comprising the cable modems $CM_2$ and $CM_3$ into interference group A for the frequency range F(1). In other words, when grouping is based on interfered list 114, downstream receptions of cable modems in each interference group for the corresponding frequency range are interfered by upstream transmissions of the cable modem in the corresponding frequency range.

In some embodiments, grouping may take advantage of the natural network architecture. For example, the cable modem $CM_1$ is grouped into interference group A with other cable modems $CM_3$ and $CM_m$ connected to a commonly coupled amplifier in cable network 12. In some embodiments, interference groups are further divided into a plurality of sub-groups with relative isolation among the sub-groups, for example, in which each sub-group comprises cable modems attached to a corresponding common tap (which is further down the network towards the cable modems than the common amplifier of the interference group). In various embodiments, cable modems in the interference group transmit upstream at a first frequency and receive downstream at a different frequency within the frequency range. For example, the cable modem $CM_1$ transmits upstream at frequency $F_1$ and receives downstream at frequency $F_2$ within frequency range F(n).

Figure 13:
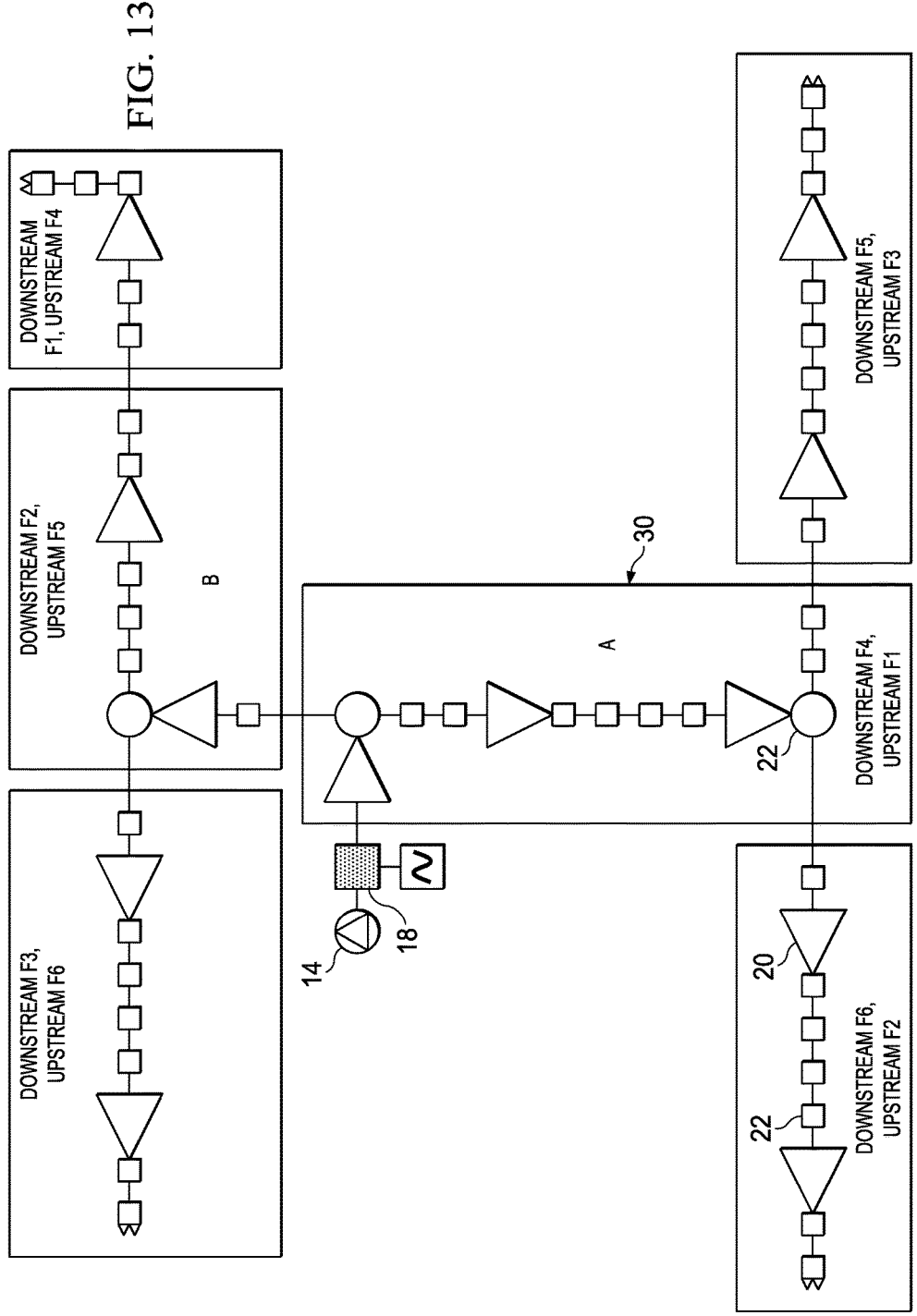
FIG. 13 is a simplified block diagram illustrating yet other example details of embodiments of the communication system.

Turning to FIG. 13, FIG. 13 is a simplified block diagram showing example details of CM grouping according to an embodiment of communication system 10. In various embodiments, cable modems 16 may be grouped into various interference groups 30 to enable full duplex communication with little to no interference. For the sake of simplicity and ease of illustration, cable modems 16 are not shown explicitly in the figure, but are merely represented by one (or more) taps and splitters 22. It may be appreciated that each tap/splitter 22 may be connected to one (or more) cable modems 16. Interference groups 30 may comprise RF isolated groups that allow frequency re-use through intelligent MAC scheduling.

Interference groups 30 provide a basis for T-R coordination in various embodiments. In a general sense, the purpose of T-R coordination is to avoid interference among cable modems 16. T-R coordination is a 2-dimensional resource allocation scheme that ensures that no CMs from the same interference group transmit simultaneously on a frequency that is being used by other CMs to receive data, and vice versa. The two dimensions comprise frequency and time.

In various embodiments, for a specific CM, its interference group is considered to be a group of CMs whose downstream receptions are interfered by the specific CM's upstream transmission. Interference groups could be frequency dependent. For example, in interference group A, cable modems 16 transmit upstream at frequency F1, and receive downstream at frequency F4, which is different from F1; in interference group B, cable modems 16 transmit upstream at frequency F5, and receive downstream at frequency F2; and so on. Cable modems 16 may belong to multiple interference groups, one for each frequency (e.g., carrier). In some embodiments, the interference may not be symmetric: a specific CM may interfere with another CM, but not the other way around. In other embodiments, the interference may be symmetric, with two CMs interfering with each other. For simplicity, relevant cable modems 16 (either interfere with or are interfered by, on any frequency) could be grouped into a single interference group. Cable modems 16 within each group tend to interfere with each other, but there are no or little interferences among cable modems 16 in different groups.

CMs that are within the same interference group may interfere with each other. That is, the upstream signal may not be sufficiently attenuated to be subtracted out of the combined spectrum. In some embodiments, the interference group may comprise CMs within the same tap group. Since there is no way of exactly knowing which CM is on which tap group, this has to be measured and the resulting groupings may not align exactly with a particular (e.g., single) tap group.

In an example embodiment, the frequency spectrum of cable network 12 may be divided into multiple frequency ranges. In some embodiments, each frequency range aligns with a channel boundary. For each specific one of cable modems 16 and each frequency range, MAC scheduler 26 may identify those cable modems 16 whose upstream transmissions interfere with downstream receptions of that specific one of cable modems 16, and those cable modems 16 whose downstream receptions are interfered by upstream transmissions of that specific one of cable modems 16, if they operate on that same frequency. Based on such identification, MAC scheduler 26 avoids assigning cable modems 16 to frequency ranges that may cause interferences among them. Cable modems 16 operate with FDD and no neighboring cable modems 16 are assigned to overlapping downstream and upstream frequency ranges.

Figure 14:
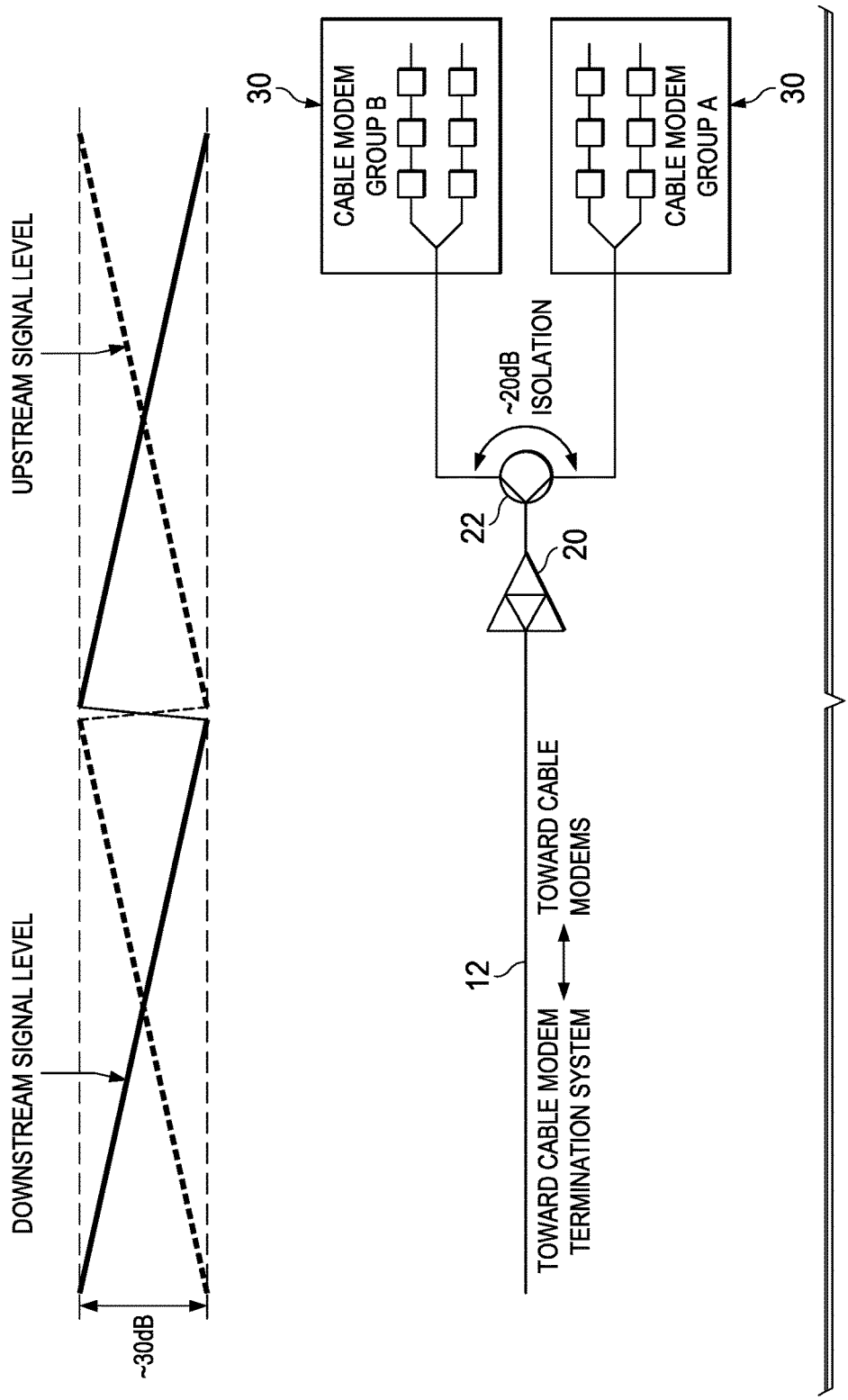
FIG. 14 is a simplified block diagram illustrating yet other example details of embodiments of the communication system.

Turning to FIG. 14, FIG. 14 is a simplified block diagram showing further example details of CM grouping according to an embodiment of communication system 10. In some embodiments, frequency planning can leverage isolations resulting from natural CM grouping in cable network 12. Note that cable network topology is largely driven by street and house layout and may vary dramatically from one community to others. The device performances (e.g., coupling, directivities, etc.) that dictate interference among cable modems 16 also vary in a wide range. Typically, distribution cables are branched out at the output of amplifier 20 (e.g., tree architecture). Taps and splitters 22 at amplifier 20 may provide approximately 20 dB isolation among cable modems 16 of each branch (e.g., division), whereas interference between downstream and upstream signals may be approximately 30 dB, permitting CMs in different groups to interfere only minimally, if at all. CMs covered by a single branch may belong to a single group in some embodiments. For example, two groups A and B of CMs that branch off after amplifier 20 may be unlikely to interfere with each other (cable modems 16 in group A will not interfere with cable modems 16 in group B and vice versa).

Figure 15:
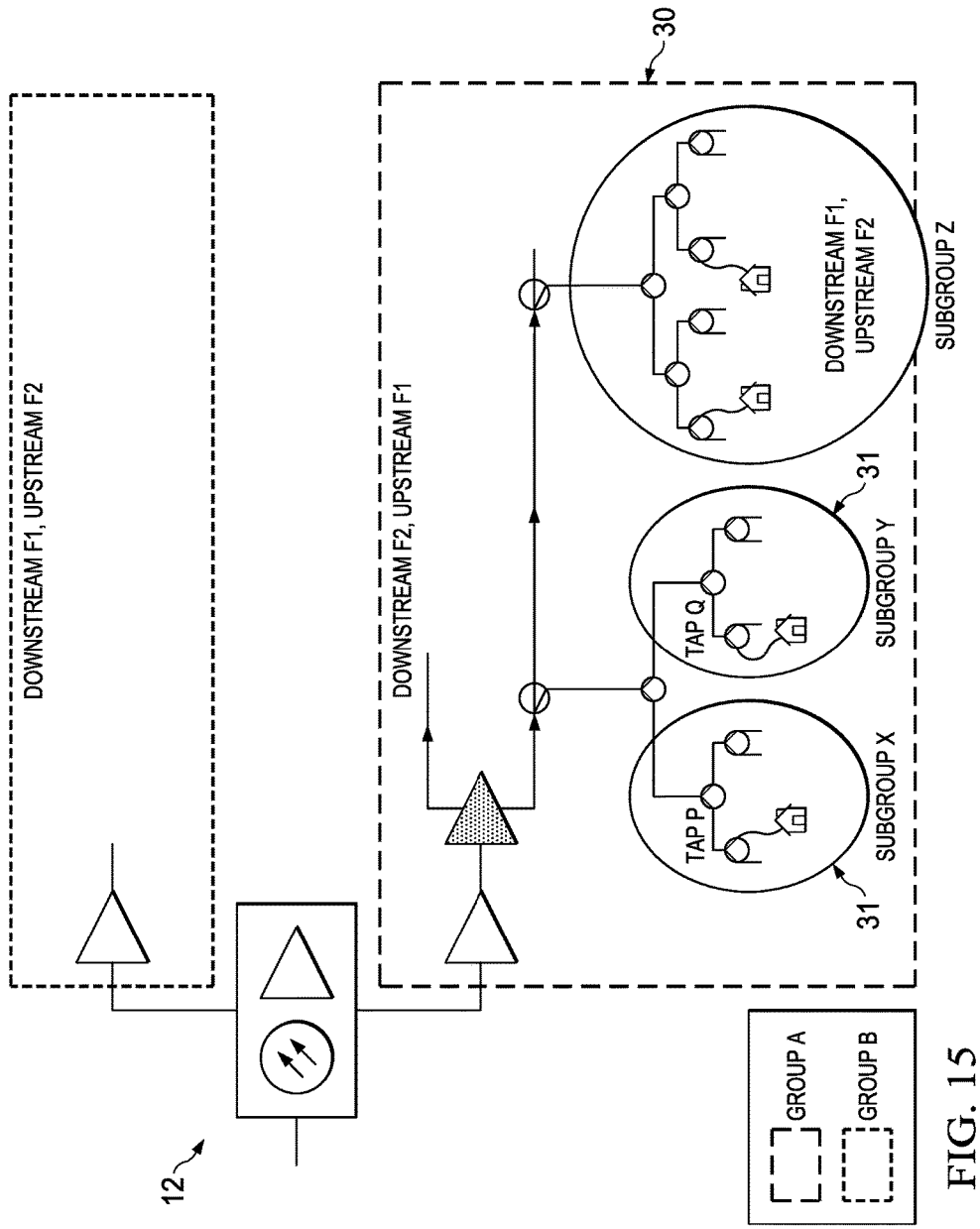
FIG. 15 is a simplified block diagram illustrating yet other example details of embodiments of the communication system.

Turning to FIG. 15, FIG. 15 is a simplified block diagram showing further example details of CM grouping according to an embodiment of communication system 10. Multiple levels of CM grouping may be implemented in cable network 12. CMs belonging to a single one of interference groups 30 could be further divided into multiple sub-groups 31. For example, consider CM groups A and B, with CMs in group A transmitting upstream at frequency F1 and receiving downstream at frequency F2, and with CMs in group B transmitting upstream at frequency F2 and receiving downstream at frequency F1. Some cable modems 16 in group A that are attached to tap P are assigned to sub-group X; other cable modems 16 in group B that are attached to tap Q are assigned to another sub-group Y. The interferences among CMs belonging to different sub-groups X and Y may be much less compared to interferences among CMs within the same sub-group (say, X or Y, individually).

According to various embodiments, CM grouping based on frequencies that take advantage of natural network architecture can improve isolation among cable modems 16, and enable full duplex operation through frequency planning. CM load balancing among groups may be achieved through sub-level grouping. For example, cable modems 16 may be load balanced among groups A and B by looking into sub-level grouping, and moving sub-groups cross groups. For example, sub-group Z initially assigned to group A may be regrouped into group B based on CM load balancing concerns. In some embodiments, frequency planning is automated, with CM load balance as one of the metrics for automation.

Figure 16:
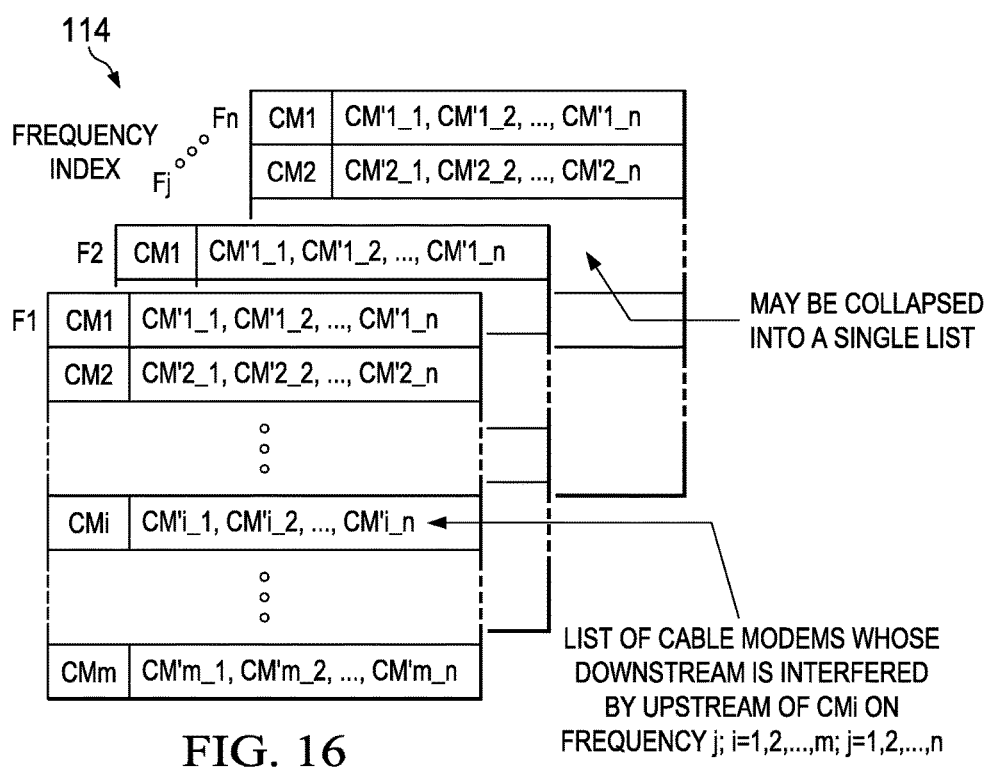
FIG. 16 is a simplified diagram illustrating example operations that may be associated with an embodiment of the communication system.

Turning to FIG. 16, FIG. 16 is a simplified diagram illustrating example details of interfered list 114 of a frequency planning scheme according to an embodiment of communication system 10. As such, a stochastic simulation scheme with an abstract model for cable network 12 may be used in some embodiments to simulate the frequency planning scheme. For example, cable network 12 is modeled by two lists: interfering list 118 and interfered list 114. Regardless of the cable topology and device performance, the frequency planning depends substantially on the two lists; in other words, relevant properties of the network topology and devices may be substantially fully captured by the two lists.

Example interfered list 114 may be generated for each cable modem and each frequency range in cable network 12. For example, the frequency spectrum may be divided into n frequency ranges and interfered list 114 generated for each one of cable modems 16 for each of the n frequency ranges. Interfered list 114 may be sorted according to frequency ranges in some embodiments, as shown in the FIGURE. For example, for frequency range F1, downstream reception of cable modems CM'1_1, CM'1_2, CM'1_$n$ is interfered by upstream transmission of cable modem CM1; downstream reception of cable modems CM'2_1, CM'2_2, CM'2_$n$ is interfered by upstream transmission of cable modem CM2; and so on. Similar lists may be generated for each of frequency ranges F1, F2, ... Fn. In some embodiments, the different lists may be collapsed into a single list, such as global interfered list 116 for example, for convenience.

Figure 17:
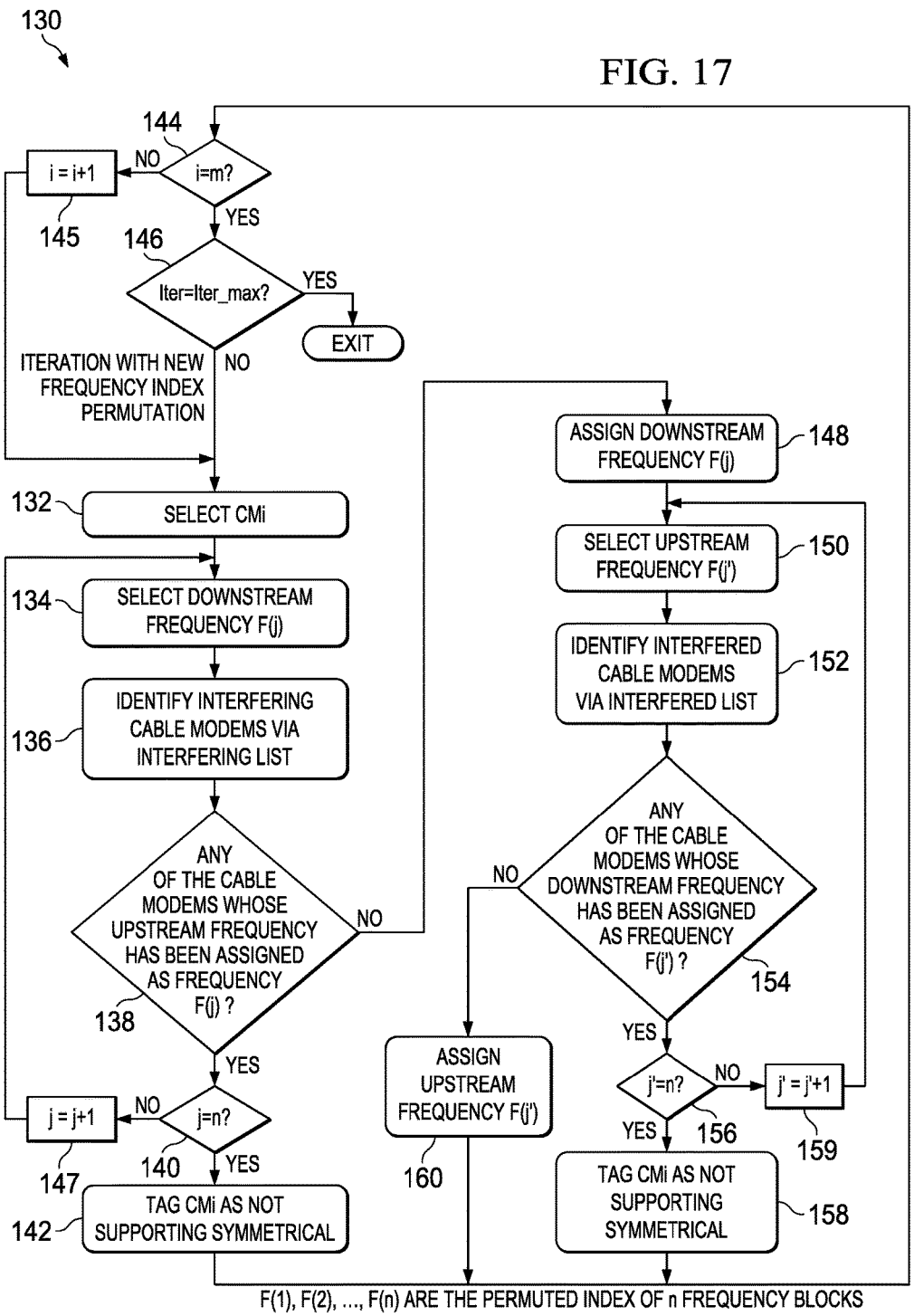
FIG. 17 is a simplified flow diagram illustrating other example operations that may be associated with an embodiment of the communication system.

Turning to FIG. 17, FIG. 17 is a simplified flow diagram illustrating example operations 130 for frequency planning that may be associated with an embodiment of communication system 10. Initially, global interfered list 116 and global interfering list 120 are generated. The operations may start at 132, at which a cable modem CM(i) is selected with index i initialized to 1 in the first iteration. At 134, frequency range F(j) is selected as the downstream reception frequency range to selected CM(i), with index j initialized to 1 in the first iteration. In other words, the first available cable modem is tentatively assigned the first selected frequency range in the first iteration. At 136, cable modems that may interfere with CM(i) is identified by looking up the corresponding entry for CM(i) in interfering list 118 for F(j).

At 138, a determination is made whether any of the identified cable modems have been assigned F(j) as the upstream transmission frequency. If yes, at 140, a determination is made whether the selected frequency range F(j) is the last block of available frequency ranges; that is, whether frequency index j is equal to the maximum value of number of frequency ranges, n. If yes, CM(i) is tagged at 142 as not supporting full duplex communication (symmetrical is the same as full-duplex communication as used herein). The operations step to 144, at which a determination is made whether the selected cable modem CM(i) is the last available cable modem (in other words, whether index i is equal to the maximum value of number of cable modems, m). If not, at 145, cable modem index i is incremented by 1, and the operations step to 132 and continue thereafter. If the selected cable modem CM(i) is the last available cable modem, a determination is made at 146 whether the iteration is the maximum number of allowed iterations. If not, the operations continue to 132 with a new frequency index permutation. Otherwise, the operations end. Turning back to 140, if the frequency index j is not n, it is incremented by 1 at 147, and the operations step to 134 and continue thereafter. Turning back to 138, if no cable modems have been assigned F(j) as the upstream transmission frequency, at 148, F(j) is assigned as the downstream reception frequency for CM(i).

At 150, F(j') is selected as the upstream transmission frequency for cable modem CM(i), with j' initialized to 1 in the first iteration. At 152, cable modems are identified that may be interfered by CM(i) by looking up the corresponding entry for CM(i) in interfered list 114 for F(j'). At 154, a determination is made whether any of the identified cable modems have been assigned a downstream reception frequency range of F(j'). If yes, at 156 a determination is made whether the selected frequency range F(j') is the last block of available frequency ranges; that is, whether frequency index j' is equal to the maximum value of number of frequency ranges, n. If yes, at 158, CM(i) is tagged as not supporting full duplex communication, and the operations step to 144 and continue thereafter. If the frequency index j' is not n, it is incremented by 1 at 159, and the operations step to 150. Turning back to 154, if no cable modems have been assigned F(j') as the downstream transmission frequency range, at 148, F(j) is assigned as the downstream reception frequency range for CM(i) at 160. The operations step to 144 and continue thereafter.

In various embodiments, operations 130 may not be fully optimized; for example, downstream reception and upstream transmission frequency ranges are assigned on a first-come-first-serve (FCFS) basis. As different cable modems may have different interfere characteristics (e.g., some may interfere with more cable modems, some less), FCFS may not result in an optimized frequency assignment (e.g., many cable modems may fail to support full duplex communication). To more fully exploit isolations among cable modems, the frequency ranges may be assigned such that cable modems with better isolations are grouped together and assigned with the same frequency range, leaving more frequency ranges for cable modems that require different frequency ranges to avoid interferences. In some embodiments, the iterations may be performed assigning each cable modem with each of the frequency ranges F(1) . . . F(n) for both downstream reception and upstream transmission, and the best combination of frequency ranges (e.g., one with the least number of interfered cable modems) may be selected as the final assignment. However, to cover all the cable modems, and all the frequencies, for both downstream reception and upstream transmission, the total number of the iterations required to final assignment is $(n^m)^2$, where n is the number of frequency ranges, and m is the number of cable modems. With n=6, m=128, there will be total $1.6096e^{199}$ iterations, which may not be practical with existing processors.

In some embodiments, a sub-optimal scheme may be implemented, in which the frequency index is permuted, and the frequency assignments are based on first-come-first-serve with respect to the cable modems, but with the permuted frequency index. The frequency assignment iterations are executed multiple times, each time with different, randomly selected frequency ranges, and the best combination of downstream and upstream frequency ranges are selected from the completed iterations. Simulations show that an optimal performance can be achieved with approximately 200 frequency permutations. The frequency planning (with the optimization step) can be tedious, but it may occur infrequently (e.g., frequency assignment may be performed only if there are changes to the network, such as addition of new taps, cable modems, etc.). In some embodiments, the frequency assignment may be performed offline, for example, with a software designed networking (SDN) application.

Figure 18:
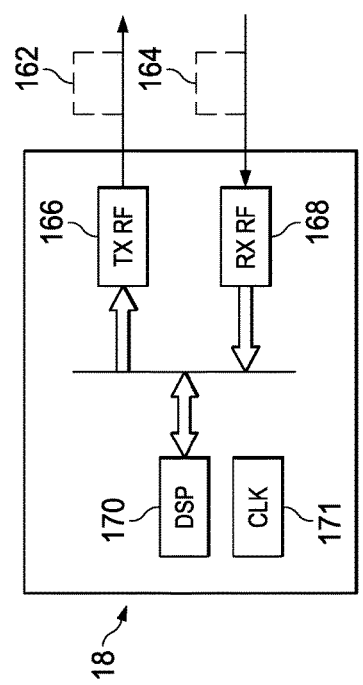
FIG. 18 is a simplified block diagram illustrating yet other example details of embodiments of the communication system.

Turning to FIG. 18, FIG. 18 is a simplified block diagram illustrating example details of transceiver 18 according to an embodiment of communication system 10. In various embodiments, each of downstream and upstream signals uses the complete frequency spectrum during full duplex communication. As a result, a transmitted signal 162 (comprising downstream data from CMTS 14 to cable modems 16) and a received signal 164 (comprising upstream data from cable modems 16 to CMTS 14) overlap in frequency and time at transceiver 18. Typically, transmitted signal 162 has a higher signal level (e.g., with more power) than received signal 164, and can completely wipe out received signal 164 if there is not sufficient isolation between a transmitter portion 166 and a receiver portion 168 of transceiver 18. In various embodiments, to enable full duplex communication in cable network 12, interferences from transmitter portion 166 may be suppressed at receiver portion 168 using an AIC algorithm implemented in a DSP 170 in transceiver 18. DSP 170 includes a memory element for storing instructions and data appropriately. A clock module 171 facilitates timing functions for the AIC algorithm. In various embodiments, clock module 171 may be embedded in DSP 170. DSP 170 may be configured to perform FFT/IFFT or other standard DSP operations. Embedded processors for control operations and I/O operations, with support for floating point operations may also be included in DSP 170.

Interference is a limiting factor in quality of full duplex communications. Different from background noise, distortion effect of self-interference cannot be mitigated by increasing transmission power because the amount of interference is directly proportional to the signal power itself. OFDM scheme suffers from interference especially when time variation exists in the channel between transmitter portion 166 and receiver portion 168.

In various embodiments, interferences coupled to receiver portion 168 arise from transmitter portion 166 due to full duplex communication, in which downstream and upstream frequencies overlap. In theory, transmitted signal 162 is known to, or can be accessed by, receiver portion 168 in transceiver 18; ideally, a copy of transmitted signal 162 may be used as a reference signal to cancel out interferences at receiver portion 168. However, the copy of transmitted signal 162 received by receiver portion 168 as the reference is an "ideal" transmitted signal, without any channel effect (e.g., micro-reflections), whereas the actual interference coupled through receiver portion 168 has channel effects. In various embodiments, the AIC algorithm executing in DSP 170 estimates the channel effects of transmitted signal 162 through a channel estimation algorithm. Receiver portion 168 imposes the estimated channel effects onto the ideal copy of transmitted signal 162, and uses the modified copy of transmitted signal 162 to cancel out the interference.

Figure 19:
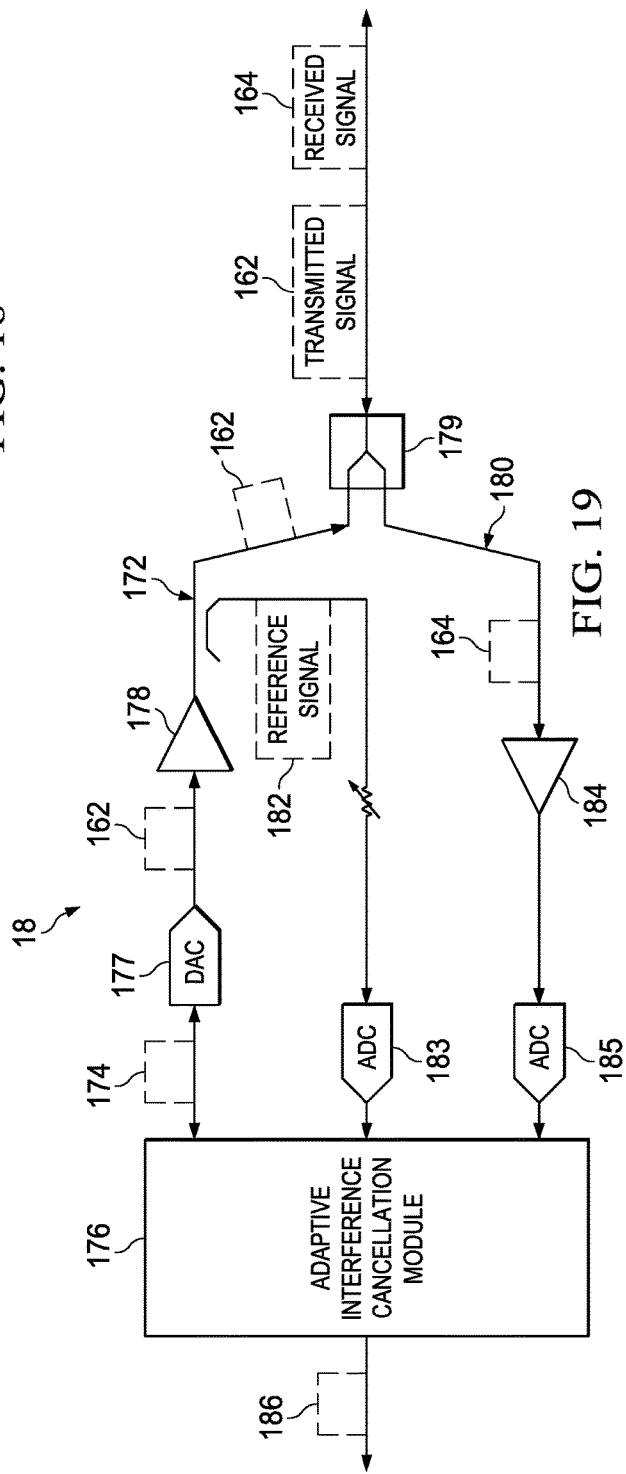
FIG. 19 is a simplified block diagram illustrating yet other example details of embodiments of the communication system.

Turning to FIG. 19, FIG. 19 is a simplified block diagram illustrating example details of transceiver 18 according to an embodiment of communication system 10. On a downstream pathway 172, an OFDM signal baseband generator (not shown) generates a baseband reference signal. In an example embodiment, the baseband reference signal comprises a pseudo-random binary sequence (PRBS) signal with a bandwidth of 12.8 MHz, at a clock rate of 20.48 MHzm with OFDM characteristics including subcarrier spacing of 20 kHz, Fast Fourier size of 1024, and a cyclic prefix up to 1.2207 μs (e.g., 25 time-domain samples). In some embodiments, an external interface with an external OFDM signal generator inputs data to be transmitted in the OFDM baseband reference signal. In some embodiments, the baseband signal with data is up sampled by 20 times to 409.6 MHz, for example, to tune to any desired location in a frequency spectrum from 0 MHz to 150 MHz. The 20 time oversamples are split into 3 steps of 5 times, 2 times and 2 times, respectively, with half band harmonics suppression filtering. A quadrature modulator modulates the oversampled signal to generate a digital baseband OFDM signal 174 (for the sake of brevity, digital baseband (BB) OFDM signal may alternatively be referred to as simply BB signal).

BB signal 174 is provided as a reference signal to an AIC module 176 (e.g., implemented in DSP 170). AIC module 176 comprises a block of instructions implementing an appropriate AIC algorithm. BB signal 174 is further converted to RF signal 162 at a digital to analog converter (DAC) 177; an amplifier 178 amplifies RF signal 162. A two-way combiner-splitter 179 transmits amplified RF signal 162 out of transceiver 18 on downstream pathway 172.

Transmitted RF signal 162 may be reflected back to transceiver 18 on an upstream pathway 180 in one or more frequencies that overlap with those of signals in upstream pathway 180 due to full duplex operation. Upstream pathway 180 refers to portions of transceiver 18 that include communication pathway of upstream signals (to CMTS 14 from cable modems 16). Thus, the reflected signal may interfere with another upstream transmission (e.g., from cable modems 16) on upstream pathway 180, generating RF signal 164, comprising the upstream transmission interfered by the reflected signal. In various embodiments, it may be desirable to extract the upstream transmission without the interferences from the reflected signal.

RF signal 164 may be received at two-way combiner-splitter 179. A portion of received RF signal 164 may be reflected back on downstream pathway 172, interfering with RF signal 162 generating an RF reference signal 182, which is provided to AIC module 176 as a digital signal after conversion by an analog-to-digital converter (ADC) 183. On upstream pathway 180, received RF signal 164 is amplified by an amplifier 184, converted to a digital signal by an ADC 185 and fed to AIC module 176.

AIC module 176 reduces interferences in RF signal 164 from the reflected signal based on BB reference signal 174 and RF reference signal 182, producing desired signal 186 as output. In a general sense, a channel impulse response can be measured from BB reference signal 174 and RF reference signal 182. In various embodiments, AIC module 176 executes the AIC algorithm and cancels out interferences in received RF signal 164 from transmitted RF signal 162. In some embodiments, prior to interference cancellation, RF signal 164 may be processed through a quadrature demodulator and subjected to decimation, at which the received 409.6 intermediate frequency (IF) signal is decimated by 20 times to a 20.48 MHz base band signal. In some embodiments, the 20 time decimations are split into three steps of 2 times, 2 times and 5 times respectively, with half band aliasing filtering. Harmonic suppression filters used at over sampling is reused as anti-aliasing filters.

In various embodiments, interference-canceled signal 186 is subjected to demodulation and fed to an OFDM signal receptor (not shown). OFDM signal reception after interference cancellation may include the following features: time tracking, frequency tracking (e.g., which may not be used if transmitter portion 166 and receiver portion 168 share the same system clock 171), channel estimation, cyclic prefix removal, Inverse Fast Fourier Transform (IFFT), constellation computation and MER computations. In some embodiments, the OFDM signal processing portion of receiver portion 168 may be implemented offline in an external computing device. The interference-canceled signal may be sent to the external computing device and post-processed with appropriate post processing algorithms.

Figure 20:
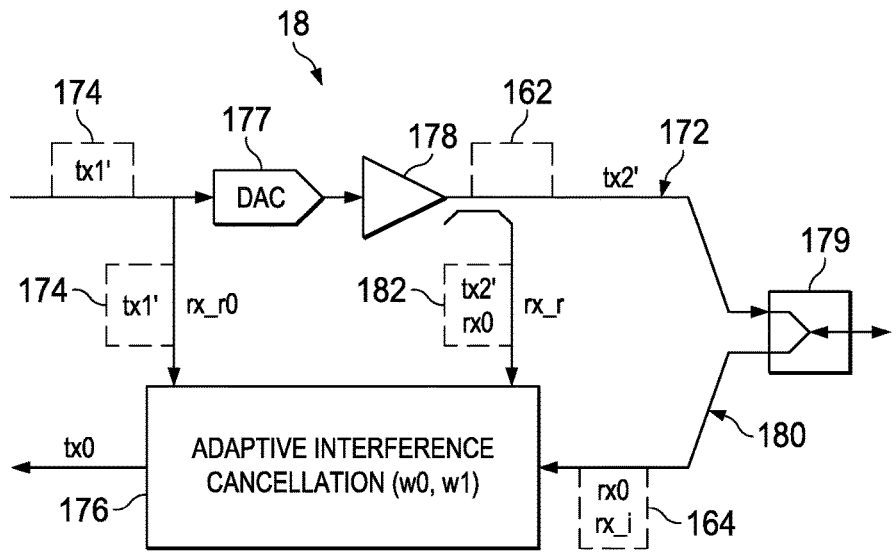
FIG. 20 is a simplified block diagram illustrating yet other example details of embodiments of the communication system.

Turning to FIG. 20, FIG. 20 is a simplified block diagram illustrating example details of transceiver signal flows and interference cancellation according to an embodiment of communication system 10. Transmitted RF signal 162 on downstream pathway 172 can loop back via multiple pathways. In general, transmitted RF signal 162 is reflected back to transceiver 18 from cable network 12. For example, one of the reflections may be through port coupling of two-way combiner-splitter 179; other reflections may occur at taps/splitters 22 from signal ringing at the respective taps/splitters 22. The reflected signal comprises time-shifted samples of transmitted RF signal 162, each time-shifted sample attenuated by differing amounts relative to transmitted RF signal 162.

Assume the gain of amplifier 176 is ~30 dB, and isolation between two output ports of 2-way combiner-splitter 177 is ~30 dB. The feedback signal through combiner port coupling may be 30 dB below the main signal, which, comparing to the interference resulting from the signal ringing, contributes only a small portion of the total interference. The feedback through signal ringing could be more dominant. Assume the nominal return loss of a tap is ~20 dB, with an additional 4 dB loss of cable/combiner, the reflected portion of transmitted signal 162 may be 6 dB above the desired signal on upstream pathway 180 of transceiver 18. For mathematical simplicity, interference from signal ringing (e.g., reflection of transmitted signal 162 into upstream pathway 180 and reflection of received signal 164 into downstream pathway 172) may be more dominant that reflections from outside transceiver 18.

For purposes of explaining mathematically, BB reference signal 174 is referred to in the figure as tx1' or alternatively as rx_r0; RF reference signal 182 comprises tx2' (referring to transmitted signal 162) and rx0 (comprising a portion of received RF signal 164) and is referred to, for mathematical convenience, as rx_r; τ corresponds to delay, with τ_i being delay on upstream pathway 180, and τ_r being delay on downstream pathway 172. Explanations of the mathematical symbols (e.g., notations) in the figure described herein are presented in the following table:

| Symbol | Relationship | Note | Channel |
|---|---|---|---|
| rx0 | received signal | received signal on upstream pathway | ideal BB signal, HFC channel |
| rx_i | rx_i = tx2' | received interference on upstream pathway (approximated to be same as transmitted RF signal merely for simplicity of explanation) | 2:1 combiner + HFC channel |
| rx | rx = rx0 + c1*rx_i | total received signal on upstream pathway; c1 is scaling factor | |
| rx_r | rx_r = tx2' + c2*rx0 | RF reference signal; c2 is scaling factor (reflection of received signal on downstream pathway approximated to be a scaled factor of received signal merely for simplicity of explanation) | hardware channel |
| rx_r0 | rx_r0 = tx1' | BB reference signal | no additional channel |
| tx0 | tx0 = conv(w1, rx) − conv(w0, rx_r) | received signal on upstream pathway after interference cancellation; conv refers to convolution function; w0 and w1 are convolution coefficients | no additional channel |
| tx1' | | transmitted BB signal on downstream pathway | no additional channel |
| tx2' | Fcn(tx1') | transmitted RF signal on downstream | nonlinear channel, |

-continued

| Symbol | Relationship | Note | Channel |
|---|---|---|---|
| | | pathway; Fcn refers to noise, amplification and DAC functions | noise |

AIC module 176 performs numerous iterations according to the AIC algorithm to reduce interference. In some embodiments, the AIC algorithm comprises calculating values of scaling factors c1 and c2, and convolution coefficients w1, w0, which are used to compute and cancel interferences of the transmitted and received signals. AIC module 176 performs interference calculations using various mathematical functions, including convolution. In a general sense, convolution is a mathematical operation on two functions, producing a third function that is typically viewed as a modified version of one of the original functions. For example, convolution is the integral of the product of the two functions after one is reversed and shifted. Mathematically, convolution of functions f(t) and g(t) can be written as (f*g)(t) to be:

$$(f*g)(t) = \int_0^\infty f(t-\tau)g(\tau)d\tau$$

Convolution is applicable because interferences can appear due to time-shifting or time lag between transmitted signals and reflected signals (e.g., signal at time t interfered by reflection of transmitted signal at time t–τ; and so on). In a general sense, convolution in the time domain can be represented by multiplication in the frequency domain. The AIC algorithm performs convolutions on received RF signal 164 and RF reference signal 182, followed by a cancellation of the convoluted RF reference signal from the convoluted received RF signal. The AIC algorithm uses convolution coefficients w0 and w1 on time-shifted samples of received RF signal 164 and RF reference signal 182 that account for time delays in reflection, the time-shifted samples being weighted with scaling factors c1 and c2 (e.g., to account for attenuations). The AIC algorithm iteratively calculates convolution coefficients w0 and w1 and scaling factors c1 and c2.

Figure 21:
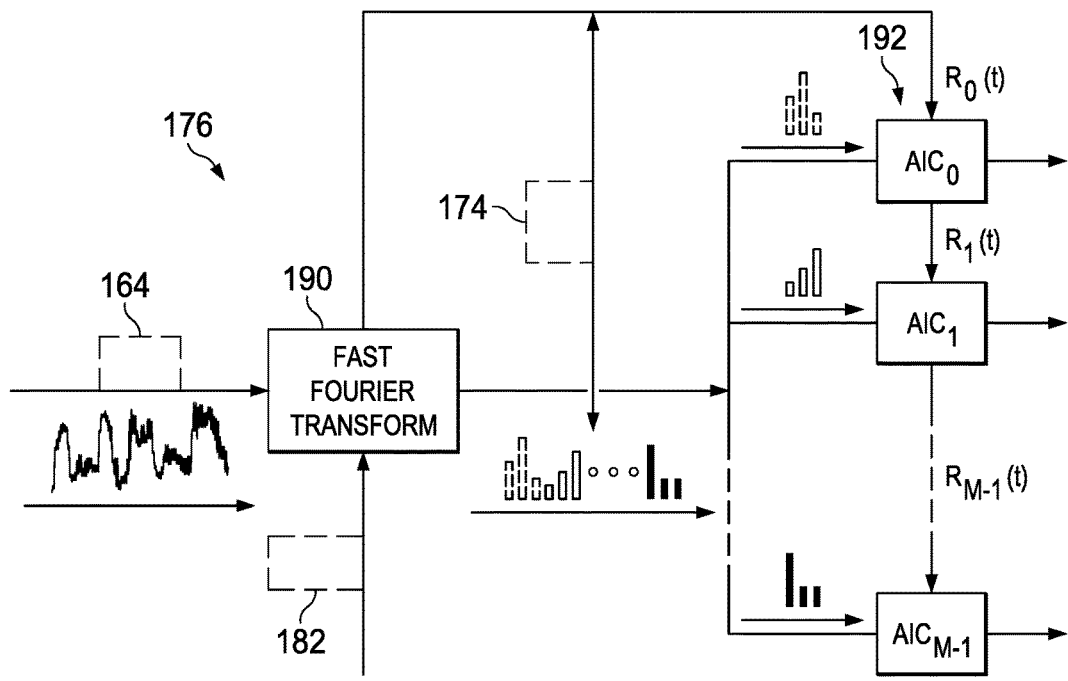
FIG. 21 is a simplified block diagram illustrating yet other example details of embodiments of the communication system.

Turning to FIG. 21, FIG. 21 is a simplified block diagram illustrating example details of AIC module 176 according to an embodiment of communication system 10. AIC module 176 includes a FFT module 190 for separating incoming signals (e.g., RF signals 164 and 182) into a plurality of subcarriers (e.g., M subcarriers). A plurality of AIC blocks 192 (e.g., $AIC_0$, $AIC_1$, ... $AIC_{M-1}$) corresponding to the plurality of subcarriers perform AIC iterations on the respective signals. RF reference signal 182 is provided to FFT module 190 after converting to a digital signal (e.g., by ADC 183); likewise received RF signal 164 is input to FFT module 190 after converting to a digital signal (e.g., by ADC 185). Because full duplex communication implies a common frequency range for upstream and downstream, BB reference signal 174 and RF reference signal 182 can indicate the common channel impulse response for both upstream and downstream communication. The transformed signals from FFT module 190 may be separated out into individual subcarrier frequencies based on information of the plurality of subcarrier frequencies comprised in digital reference signal 174. Each AIC block 192 may separately execute the AIC algorithm to reduce interferences.

Figure 22:
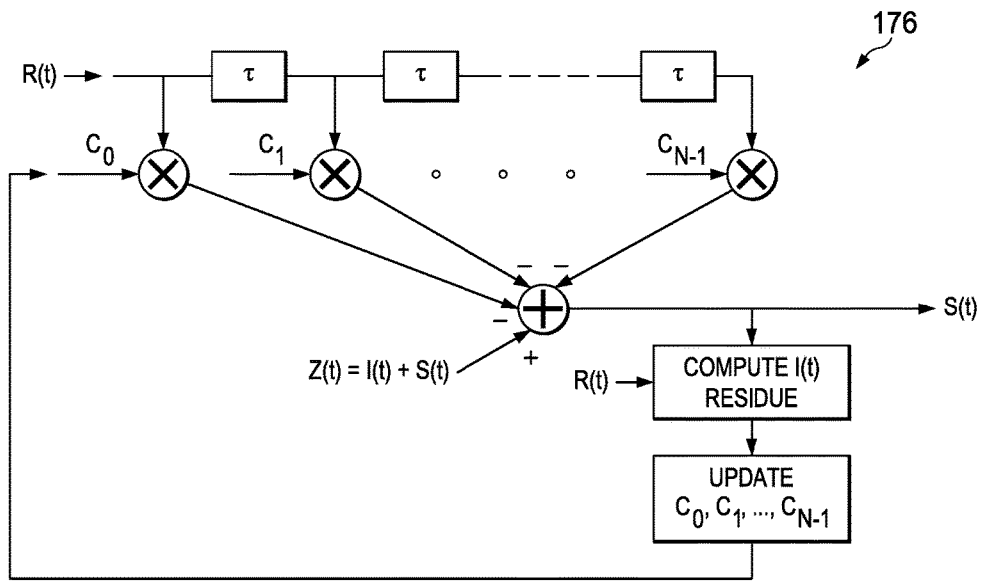
FIG. 22 is a simplified block diagram illustrating yet other example details of embodiments of the communication system.

Turning to FIG. 22, FIG. 22 is a simplified block diagram illustrating example details of AIC module 176 according to an embodiment of communication system 10. R(t) is RF reference signal 182 input into AIC module 176; I(t) is the interference signal coupled with desired signal 186; Z(t) is input RF signal 164, and comprises a combination of interference signal I(t) and desired signal S(t). AIC algorithms may execute assuming interference from signals during a time interval divided into n periods. For example, the interference may comprise reference signal R(t), R(t–τ), R(t–2τ) ... R(t–(n–1)τ). Each time-shifted sample R(t–τ), R(t–2τ) ... R(t–(n–1)τ) may be attenuated suitably. The attenuation may be captured as weighting factors $c_0, c_1, \ldots c_{N-1}$, corresponding to the n periods. For example, estimated interference signal based on the reference signal comprises $c_0 R(t) + c_1 R(t-\tau) + \ldots + c_{N-1} R(t-(n-1)\tau)$. In an example embodiment, the weighting factors may comprise a combination of scaling factors c1 and c2 and convolution coefficients w0 and w1.

The estimated interference signal may be compared with the input signal and a residue, comprising the difference, computed. The residue may be used to update values of weighting factors $c_0, c_1, \ldots c_{N-1}$ suitably. The residue can indicate that further iterations are in order, and values of weighting factors $c_0, c_1, \ldots c_{N-1}$ may be updated and the operations repeated until an acceptable residue is obtained. The AIC algorithm can converge and take full effect within seconds. The channels in cable network 12 being quasi-static (i.e., no mobility), the AIC algorithm can maintain tracking of channel variations caused by various parameters such as temperature variations, environment changes, or device aging.

Note that in some embodiments, AIC module 176 executes the AIC algorithm as described herein separately for each subcarrier frequency. In such embodiments, R(t), Z(t), I(t) and S(t) correspond to the portion of the respective signals (e.g., RF reference signal 182, RF signal 164, interference signal, and desired signal 186) corresponding to the particular subcarrier frequency at which the AIC algorithm is being executed. For example, if AIC algorithm at subcarrier frequency i is being executed, $R_i(t)$, $Z_i(t)$, $I_i(t)$ and $S_i(t)$ correspond to portions of RF reference signal 182, RF signal 164, interference signal, and desired signal 186 at subcarrier frequency i.

Figure 23A:
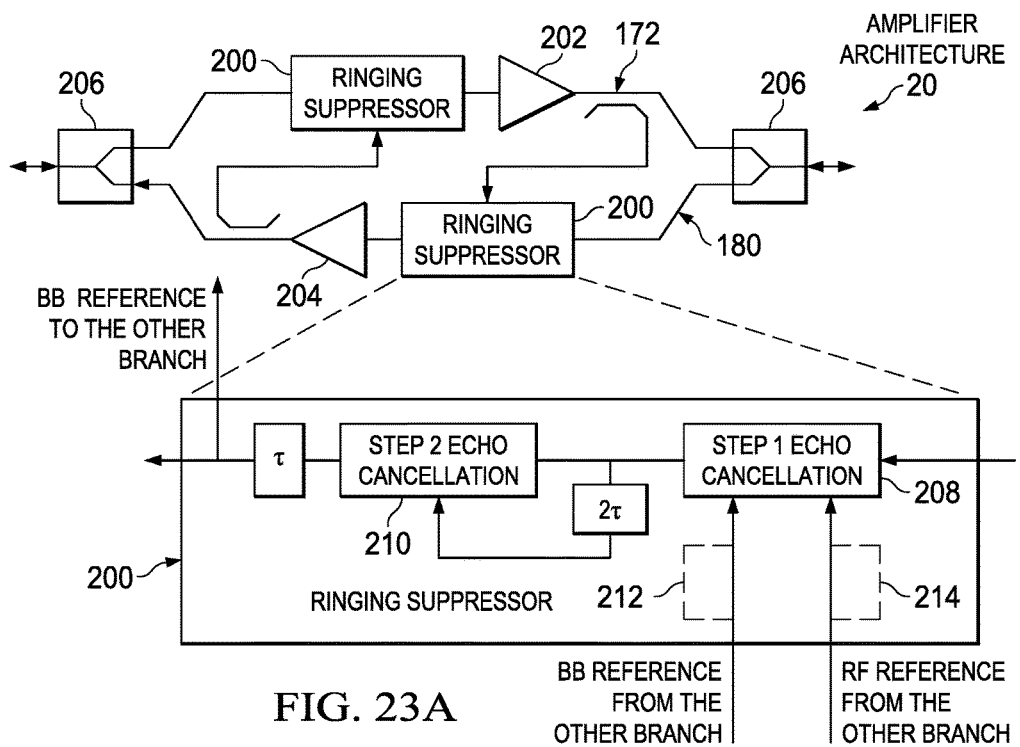
FIG. 23A is a simplified block diagram illustrating yet other example details of embodiments of the communication system.
Figure 23B:
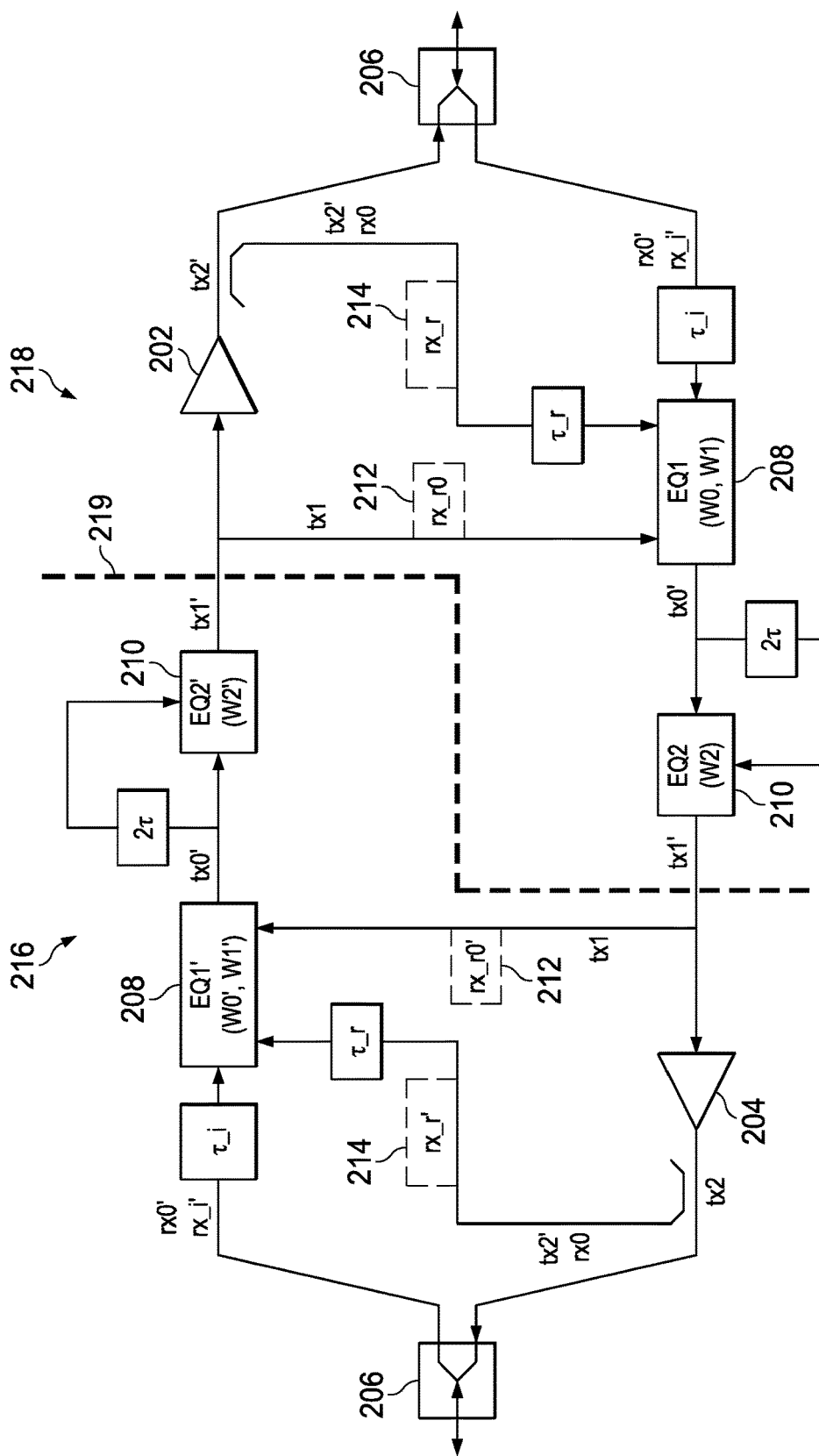
FIG. 23B is a simplified block diagram illustrating yet other example details of embodiments of the communication system.

Turning to FIGS. 23A and 23B, FIGS. 23A and 23B are simplified block diagrams illustrating an example amplifier 20 according to an embodiment of communication system 10. Note that amplifier 20 is more complicated than transceiver 18, but the basic DSP building function blocks are similar. Amplifier 20 includes a ringing suppressor 200 each on downstream pathway 172 and upstream pathway 180; a downstream amplifier 202; an upstream amplifier 204; and a two-way combiner-splitter 206 on each end. The DSP algorithm in ringing suppressor 200 is similar to AIC module 176 of transceiver 18, with some modifications for echo cancellation. In a general sense, discontinuities (e.g., limited return loss of tap/splitter, etc.) are inevitably present in cable network 12, and cause signal bouncing, resulting in signal ringing. Signal ringing can be the main source of the interferences between downstream pathway 172 and upstream pathway 180 in full duplex operation.

Signal flows on downstream pathway 172 enter amplifier 20 through two-way combiner-splitter 206 on one end, flows through ringing suppressor 200 on downstream pathway 172, is amplified at downstream amplifier 202, and exits out through two-way combiner-splitter 206 on the other end. Signal flows on upstream pathway 180 enter amplifier 20 through two-way combiner-splitter 206 on one end, flows through ringing suppressor 200 on upstream pathway 180, is amplified at upstream amplifier 204, and exits out through two-way combiner-splitter 206 on the other end. The signal flows on downstream pathway 172 and upstream pathway 180 can be considered to be mirror images of each other; as such, ringing suppressor 200 on downstream pathway 172 can be identical with ringing suppressor 200 on upstream pathway 180.

In some embodiments, two steps of echo cancellations are implemented in ringing suppressor 200. At step 1, the AIC algorithm of transceiver 18 is implemented with a relaxed cancellation specification (e.g., suppressing interferences to a few dB below the desired signal). Some of the interference residue out of this step may loop back to the other pathway of amplifier 20 where it is suppressed in step 2, and some of the interference residue may proceed to transceiver 18 where it is cancelled at AIC module 176 of transceiver 18. In step 2, echoes from the same pathway may be cancelled. The echo cancelation algorithm at step 2 comprises a modified AIC algorithm with the reference signal being the output signal of the previous step on the same pathway. To enable the echo cancelation, a delay may be added on each pathway to ensure that the reflections are distinct in time from the main signal so they can be suppressed with the echo cancellation algorithm.

To explain further, ringing suppressor 200 includes two echo cancellation modules 208 and 210. Input to echo cancellation module 208 includes BB reference signal 212 and RF reference signal 214 from the other pathway (e.g., for ringing suppressor 200 on upstream pathway 180, BB reference signal 212 and RF reference signal 214 are from downstream pathway 172; and vice versa). Unlike transceiver 18, amplifier 20 requires echo cancellation on each pathway from its own signal. To this end, echo cancellation module 210 performs echo cancellation on signals output from echo cancellation module 208. The reference signal to echo cancellation module 210 may comprise a time-shifted output signal from echo cancelation module 208. In an example embodiment, the time shifting may be by two time periods ($2\tau$). The digital portion of the output from echo cancellation module 210 may be fed as BB reference signal 212 to ringing suppressor 200 on the other pathway.

Turning to FIG. 23B, FIG. 23B shows example mathematical details of amplifier 20 according to an embodiment of communication system 10. Amplifier 20 can be considered to comprise mirror images 216 and 218 around imaginary separator 219. Each portion 216 and 218 comprises an amplifier, a signal flowing through downstream pathway 172, another signal flowing through upstream pathway 180, and two echo cancellation modules 208 and 210. For the sake of simplicity, echo cancellation module 208 is referred to as equalizer 1 (EQ1), and echo cancellation module 210 is referred to as equalizer 2 (EQ2). EQ1 computes convolution coefficients w0, and w1; EQ2 computes convolution coefficient w2. The various symbols and notations in the figure are explained in the following table:

| Signals | Relationship | Note | Channel |
| --- | --- | --- | --- |
| rx0 | received signal | received signal on upstream pathway | ideal BB signal, HFC channel |
| rx_i | rx_i = tx2' | received interferences on upstream pathway | 2:1 combiner + HFC channel |
| rx | rx = rx0 + c1*rx_i | total received signal on upstream pathway; c1 is a scaling factor | |
| rx_r | rx_r = tx2' + c2*rx0' | received RF reference signal on upstream pathway; c2 is a scaling factor | hardware channel |
| rx_r0 | rx_r0 = tx1' | received BB reference signal on upstream pathway | no additional channel |
| tx0 | tx0 = conv(w1, rx(t − τ_i) − conv(w0, rx_r(t − τ_r)) | transmitted signal after first interference cancellation on upstream pathway; 1 ≤ τ ≤ min(τ_i, τ_r), τ corresponding to delay, with τ_i being the delay on the upstream pathway, and τ_r being the delay on the downstream pathway | no additional channel |
| tx1 | tx1 = tx0 − conv(w2, tx0(t − 2τ_i)) | transmitted signal after second interference cancellation on upstream pathway | no additional channel |
| tx2 | Fcn(tx1) | transmitted RF signal on upstream pathway; Fcn refers to noise, amplification and DAC functions | nonlinear channel, noise |
| rx0' | received signal | received signal on downstream pathway | ideal BB signal, HFC channel |
| rx_i' | rx_i' = tx2 | received interferences on downstream pathway | 2:1 combiner + HFC channel |
| rx' | rx' = rx0' + c1'*rx_i' | total received signal on downstream pathway; c1' is a scaling factor | hardware channel |
| rx_r' | rx_r' = tx2 + c2'*rx0 | received RF reference signal on downstream pathway; c2' is a scaling factor | hardware channel |
| rx_r0' | rx_r0' = tx1 | received BB reference signal on downstream pathway | no additional channel |
| tx0' | tx0' = conv(w1', rx'(t − τ_i) − conv(w0', rx_r'(t − τ_r)) | transmitted signal after first interference cancellation on downstream pathway | no additional channel |

| Signals | Relationship | Note | Channel |
|---------|--------------|------|---------|
| tx1' | tx1' = tx0' − conv(w2', tx0'(t − 2τ_i)) | transmitted signal after second interference cancellation on downstream pathway | no additional channel |
| tx2' | Fcn(tx1') | transmitted RF signal on downstream pathway; Fcn refers to noise, amplification and DAC functions | nonlinear channel, noise |

Each pathway generates 4 signals (e.g., rx, tx0, tx1, and tx2 on upstream pathway and rx', t0', tx1' and tx2' on downstream pathway), and receives three signals, rx_i, rx_r, rx_r0, from the other pathway. c1, c2, c1', and c2' are constants (scaling factors)

Turning to FIG. 24, FIG. 24 is a simplified diagram showing an example AIC algorithm 220 for computing convolution coefficients according to an example embodiment. Equalizer 208 (EQ1) of amplifier 20, and AIC module 176 of transceiver 18 execute algorithm 220 and determines values of convolution coefficients w0 and w1. AIC algorithm 220 presented herein is in MATLAB language. However, it will be appreciated by persons with skill in the art that any suitable programming language may be used to implement AIC algorithm 220 within the broad scope of the embodiments.

Figures 25, 26:
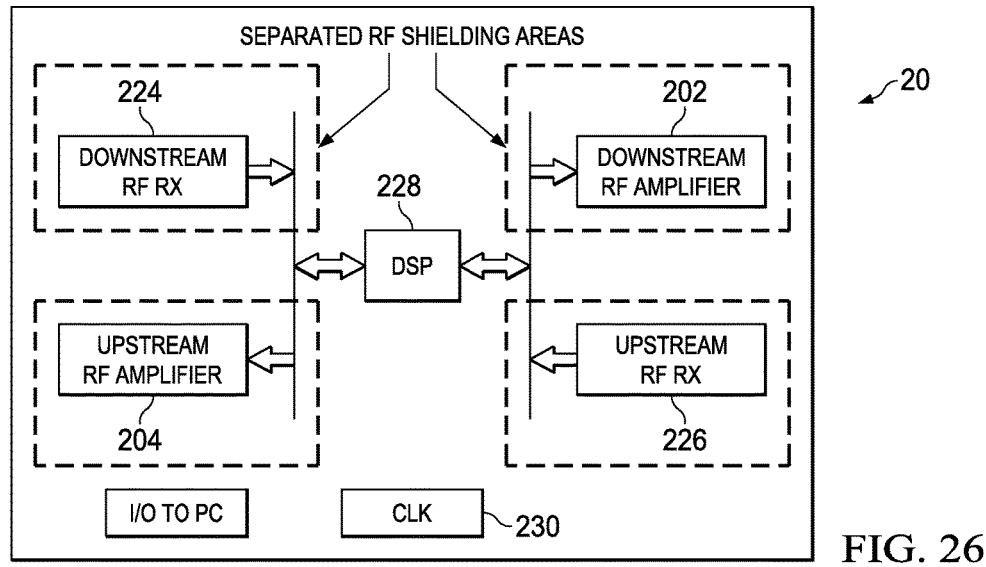
FIG. 25 is a simplified diagram illustrating yet other example operations that may be associated with an embodiment of the communication system.
FIG. 26 is a simplified block diagram illustrating yet other example details of embodiments of the communication system.

Turning to FIG. 25, FIG. 25 is a simplified diagram showing an example echo cancellation algorithm 222 for computing convolution coefficients according to an example embodiment. Equalizer 210 (EQ2 or EQ2') of amplifier 20 executes echo cancellation algorithm 222 and determines values of convolution coefficient w2. Echo cancellation algorithm 222 presented herein is in MATLAB language. However, it will be appreciated by persons with skill in the art that any suitable programming language may be used to implement echo cancellation algorithm 222 within the broad scope of the embodiments.

Turning to FIG. 26, FIG. 26 is a simplified block diagram illustrating example details of a hardware implementation of amplifier 20 according to an embodiment of communication system 10. Amplifier 20 may include downstream amplifier 202, upstream amplifier 204, a downstream receive module 224 and an upstream receive module 226. Each receive module 224 may be similar to receiver portion 168 of transceiver 18. A DSP 228 may execute AIC algorithm 220 and echo cancellation algorithm 222. In some embodiments, ringing suppressor 200 may be implemented in DSP 228. A clock 230 may facilitate timing operations of DSP 228. Various modules, such as downstream amplifier 202, upstream amplifier 204, downstream receive module 224 and upstream receive module 226 may be RF shielded from each other appropriately.

Figure 27:
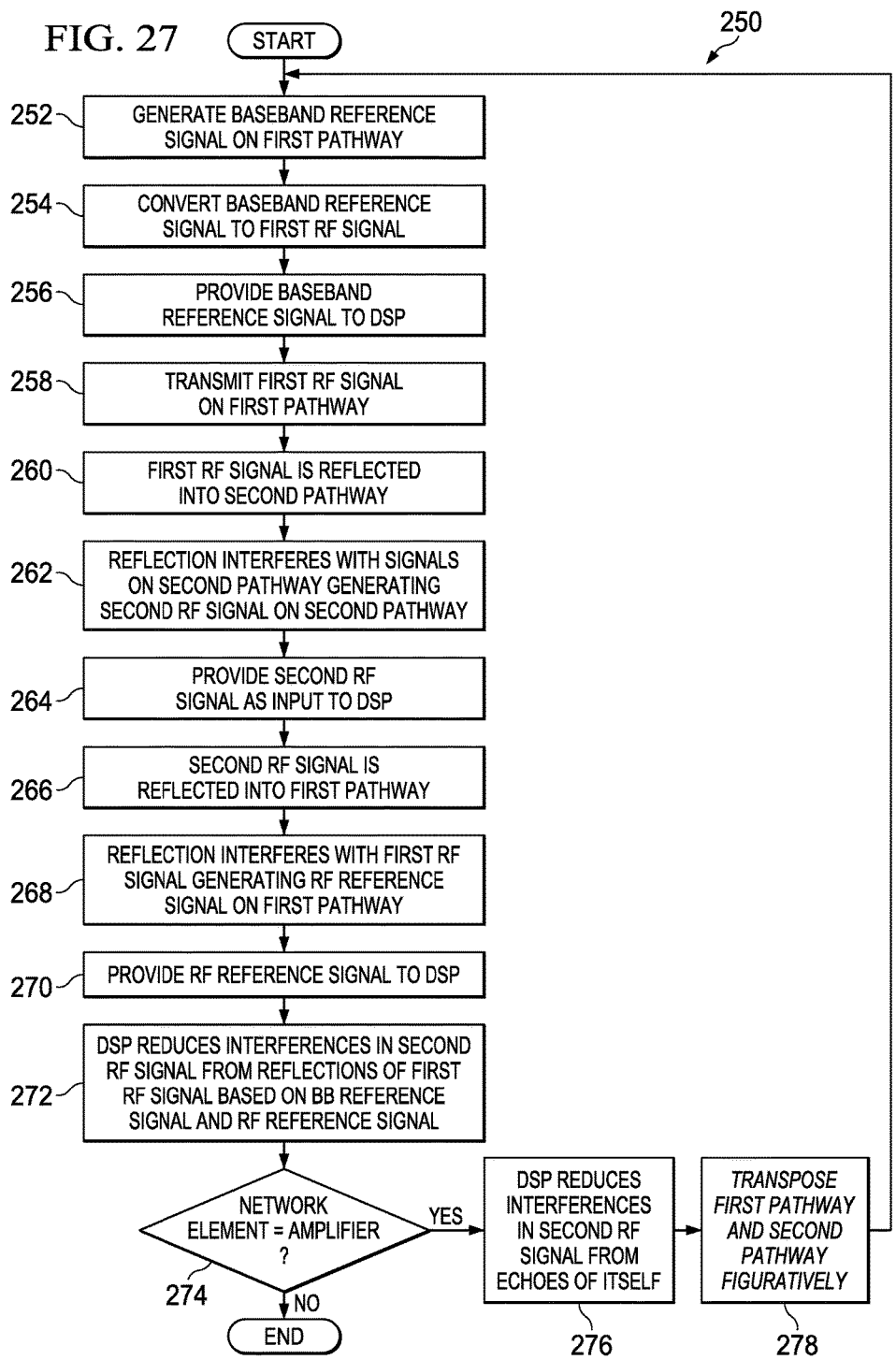
FIG. 27 is a simplified flow diagram illustrating yet other example operations that may be associated with an embodiment of the communication system.

Turning to FIG. 27, FIG. 27 is a simplified flow diagram illustrating example operations 250 associated with interference cancellation according to an embodiment of communication system 10. At 252, a BB reference signal (e.g., tx1') is generated on a first pathway (e.g., downstream pathway 172 or upstream pathway 180) of a network element. As used herein, the term "network element" encompasses a transceiver (e.g., transceiver 18), an amplifier (e.g., amplifier 20), or other network component of cable network 12 supports full duplex communication, and through which signals flow in an upstream direction and downstream direction in overlapping frequency ranges. If the network element is a transceiver, the BB reference signal tx1' may be generated at transceiver 14; if the network element is an amplifier, the BB reference signal may be provided from a second pathway (e.g., if the first pathway is downstream pathway 172, the second pathway is upstream pathway 180, and vice versa).

At 254, the BB reference signal tx1' is converted to a first RF signal tx2'. At 256, the BB reference signal tx1' is provided to a signal processor (e.g., DSP 170, DSP 228) as BB reference signal rx_r0. At 258, the first RF signal tx2' is transmitted on the first pathway. At 260, the first RF signal tx2' is reflected into the second pathway. At 262, the reflection (e.g., rx_i) interferes with signals (e.g., rx0) on the second pathway generating a second RF signal rx (rx=rx0+ c1*rx_i) on the second pathway. At 264, the second RF signal rx is provided as input to the signal processor (e.g., after suitably amplifying and converting to digital domain). At 266, the second RF signal is reflected into the first pathway. At 268, the reflection interferes with first RF signal tx2' generating RF reference signal rx_r on the first pathway (rx_r=tx2'+c2*rx0). At 270, the RF reference signal rx_r is provided to the signal processor (e.g., after suitably amplifying and converting to digital domain). At 272, the signal processor reduces interferences in the second RF signal rx from reflections of the first RF signal tx2' based on the BB reference signal rx_r0 and RF reference signal rx_r to generate output tx0. At 274, if the network element is an amplifier (e.g., as opposed to a transceiver), the signal processor further reduces interferences in the second RF signal rx from echoes of itself to generate output tx1; in effect a time-shifted sample of tx0 is fed as the reference signal for echo cancellation purposes. In some embodiments, the time-shifting is equal to two time periods (e.g., 2τ) at 276. Operations 252 to 276 described so far comprise interference cancellations on the second pathway due to reflections from the first pathway.

At 278, the first branch and the second branch are transposed figuratively. In other words, the output tx1 comprises the BB signal on the second pathway, which is fed into the AIC module of the first pathway as the BB reference signal for interference cancellation on the first pathway. Operations 252 to 276 are repeated for interference cancellations on the first pathway due to reflections from the second pathway. Note that the transceiver does not have parallel mirror-image pathways and is less complex than the amplifier in regards to interference cancellation operations.

Figure 28:
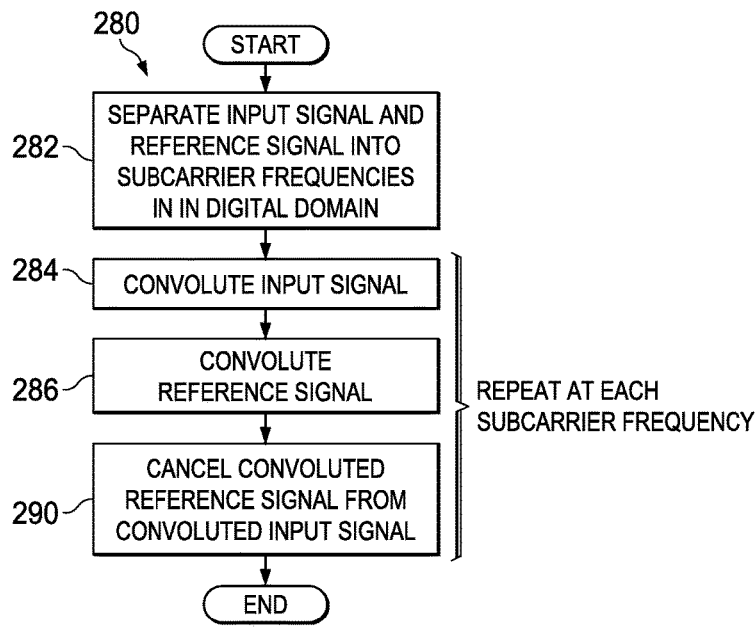
FIG. 28 is a simplified flow diagram illustrating yet other example operations that may be associated with an embodiment of the communication system.

Turning to FIG. 28, FIG. 28 is a simplified flow diagram illustrating example operations 280 that may be associated with AIC operations according to an example embodiment of communication system 10. At 282, the input signal (rx, rx') and the reference signal (e.g., rx_r, rx_r') provided to the signal processor (e.g., DSP 170, DSP 228) may be separated into subcarrier frequencies in the digital domain (e.g., after FFT, and comparison with BB reference signal rx_r0, rx_r0'). The input signal refers to the signal to be processed to remove interferences. At 284, the input signal is subjected to a convolution function. For example, the convolution function may result in a signal comprising weighted time-shifted samples of the input signal. At 286, the reference signal is subjected to another convolution function. For example, the another convolution function may result in another signal comprising weighted time-shifted samples of the reference signal. At 290, the convoluted reference signal is cancelled (e.g., subtracted) from the convoluted input signal. Operations 284-290 may be repeated at each subcarrier frequency.

Figure 29:
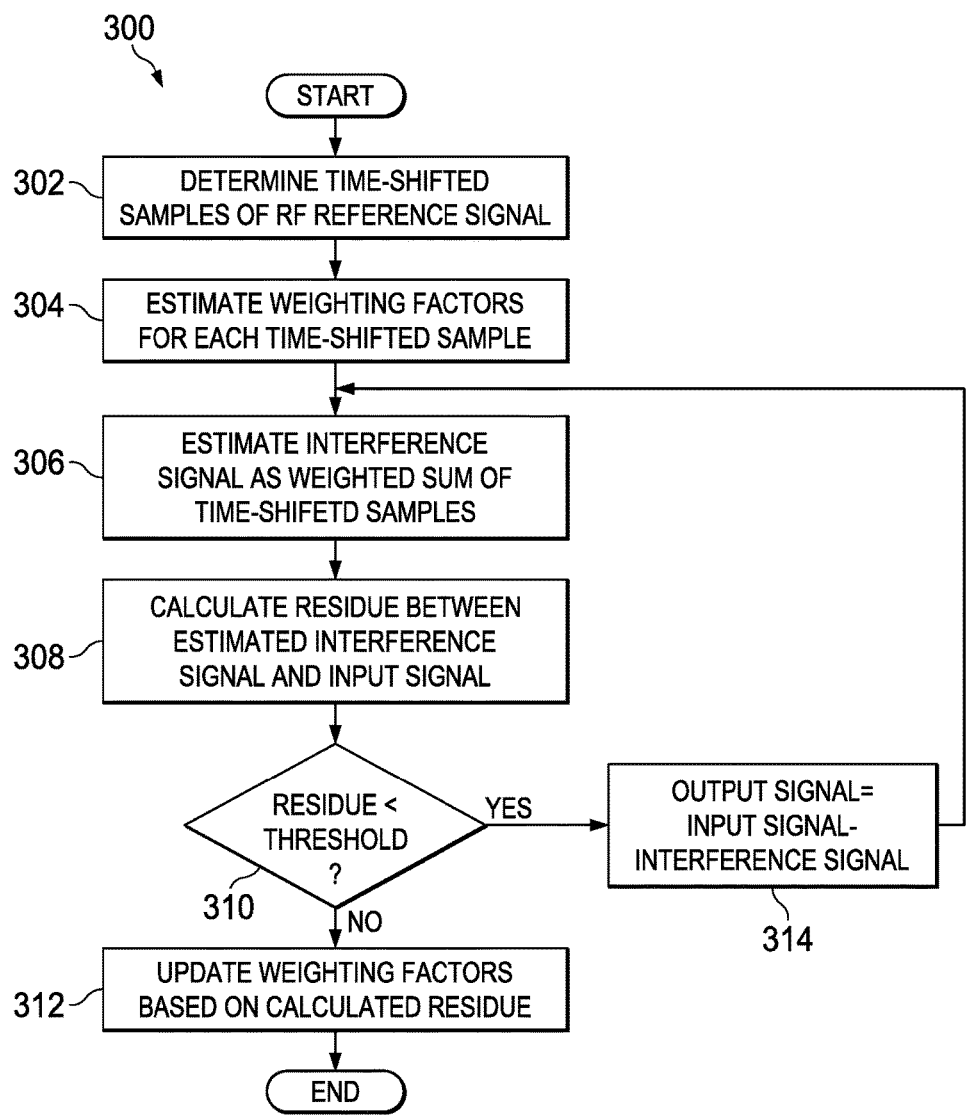
FIG. 29 is a simplified flow diagram illustrating yet other example operations that may be associated with an embodiment of the communication system.

Turning to FIG. 29, FIG. 29 is a simplified flow diagram illustrating example operations 300 that may be associated with AIC operations according to an example embodiment of communication system 10. At 302, time-shifted samples of RF reference signal (R(t)) is determined (e.g., at time t, $t-\tau, t-2\tau, \ldots t-(n-1)\tau$). At 304, weighting factors (e.g., $C_1$, $C_2, \ldots C_{N-1}$) is estimated. At 306, an interference signal is estimated as a weighted sum of the time-shifted samples (e.g., $\Sigma_0^{n-1} R(t-i\tau)$). At 308, a residue is calculated between the estimated interference signal and the input signal (Z(t)). At 310, a determination is made whether the calculated residue is less than a predetermined threshold. If not, at 312, the weighting factors are updated based on the calculated residue and the operations loop back to 306, and continue thereafter in successive iterations. If the residue is less than the predetermined threshold, at 314, the output signal (S(t)) is determined to be the input signal without interferences (e.g., S(t)=Z(t)-I(t)).

Figure 30A:
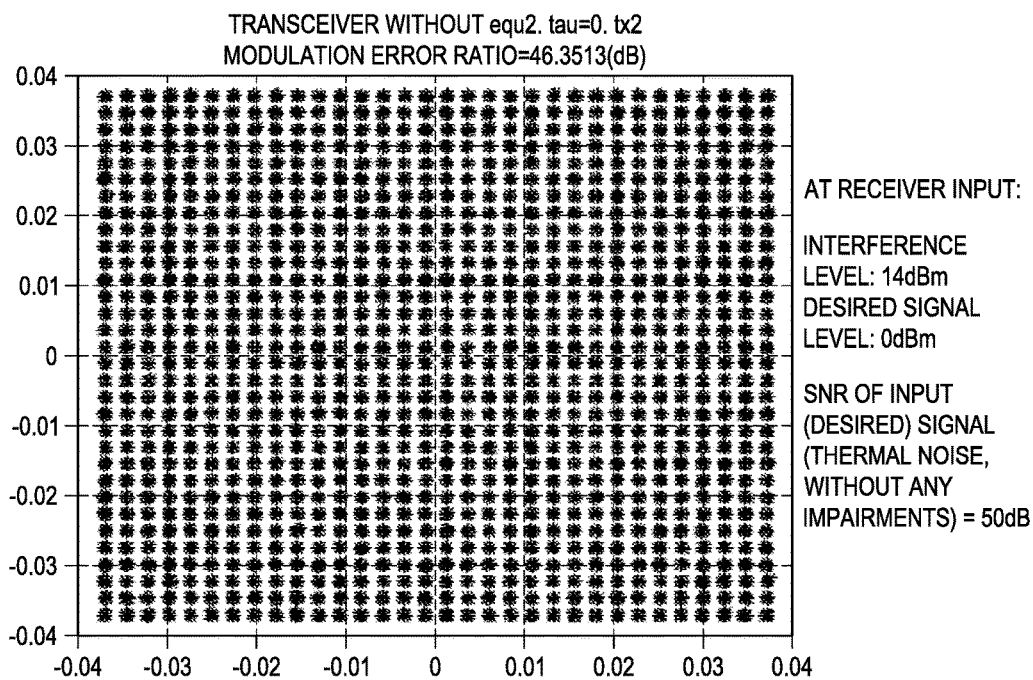
FIG. 30A is a simplified diagram illustrating yet other example details of embodiments of the communication system.
Figure 30B:
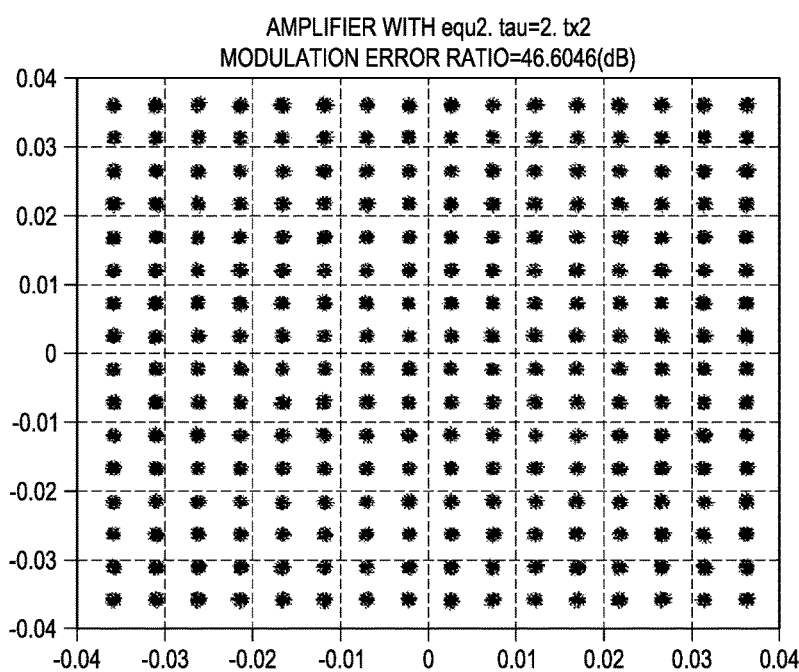
FIG. 30B is a simplified diagram illustrating yet other example details of embodiments of the communication system.
Figure 30C:
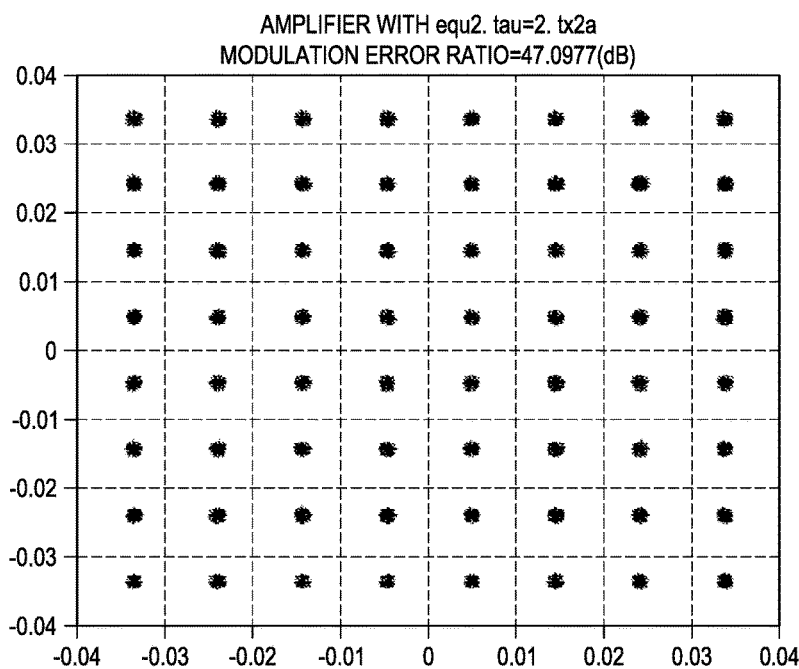
FIG. 30C is a simplified diagram illustrating yet other example details of embodiments of the communication system.

Turning to FIGS. 30A, 30B, and 30C, FIGS. 30A, 30B, and 30C show simulation results with various amplifier types. FIG. 30A shows received signal constellations with amplifier 20 that does not include echo cancellation module 210 (e.g., without EQ2). At receiver input, the interference level is 14 dBM, and desired signal level is 0 dBm. The SNR of desired signal (thermal noise, without impairments) is 50 dB. FIG. 30B shows signal quality of signal tx2, and FIG. 30C shows signal quality of signal tx2'.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, CMTS 14, MAC scheduler 26, amplifier 20, and transceiver 18. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, CMTS 14, MAC scheduler 26, amplifier 20, and transceiver 18 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 28) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 27, DSP 170, DSP 228) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    categorizing a plurality of cable modems in a cable network into interference groups;
    scheduling, by a cable modem termination system (CMTS) in the cable network, upstream transmissions and downstream receptions for cable modems in each interference group, such that no cable modem of any one interference group transmits upstream in a frequency range simultaneously as another cable modem in the same interference group receives downstream in the frequency range, wherein downstream transmission frequency is interleaved across a downstream symbol spanning a frequency range of an orthogonal frequency division multiplex block, wherein upstream transmission frequency is interleaved across an upstream symbol, wherein the upstream symbol is aligned with the downstream symbol;
    generating scheduling information of the scheduling; and
    transmitting the scheduling information to the cable modems.

2. The method of claim 1, further comprising scheduling cable modems in different interference groups to transmit upstream and receive downstream simultaneously in the frequency range.

3. The method of claim 1, wherein the cable modems are categorized into the interference groups through a ranging process.

4. The method of claim 1, wherein downstream transmission time is interleaved such that downstream data spans multiple symbols overlapped with each other, wherein upstream transmission time is not interleaved.

5. The method of claim 1, wherein the interference groups are sorted into interference blocks, wherein each interference block comprises a plurality of symbols including a symbol for guard time, wherein interleaving is implemented using the interference blocks.

6. The method of claim 1, wherein frequency interleaving is added to time interleaving, wherein symbols at each symbol time are rearranged according to a storage access scheme without introducing delay.

7. The method of claim 1, facilitating full duplex communication in the overall cable network across the frequency range and simplex communication in each individual interference group when the scheduling is implemented in distributed mode.

8. The method of claim 7, wherein the interference groups are identified by respective group labels, wherein downstream transmission in a frequency range to a particular interference group includes the particular interference group's group label in a forward error correction (FEC) codeword, distinguishing the downstream transmission in the frequency range to the interference group from downstream transmission to other interference groups.

9. The method of claim 8, wherein the FEC codeword is several codewords in advance of other data in the downstream transmission to the interference group, allowing cable modems in the interference group to anticipate the other data ahead of actual reception, and scheduling upstream transmission accordingly.

10. The method of claim 8, wherein the cable modems in the interference group are not allowed to transmit upstream in the frequency range when the downstream FEC codeword is being received by the interference group.

11. Non-transitory tangible computer-readable media that includes instructions for execution, which when executed by a processor, is operable to perform operations comprising:
    categorizing, by the processor disposed in a cable modem termination system (CMTS) in the cable network, a plurality of cable modems in a cable network into interference groups;
    scheduling upstream transmissions and downstream receptions for cable modems in each interference group, such that no cable modem of any one interference group transmits upstream in a frequency range simultaneously as another cable modem in the same interference group receives downstream in the frequency range, wherein the interference groups are sorted into interference blocks, wherein each interference block comprises a plurality of symbols including a symbol for guard time, wherein interleaving is implemented using the interference blocks;
    generating scheduling information of the scheduling; and
    transmitting the scheduling information to the cable modems.

12. The non-transitory tangible computer-readable media of claim 11, wherein downstream transmission time is interleaved such that transmitted data spans multiple symbols overlapped with each other, wherein upstream transmission time is not interleaved.

13. The non-transitory tangible computer-readable media of claim 11, wherein downstream transmission frequency is interleaved across a downstream symbol spanning a frequency range of an orthogonal frequency division multiplex block, wherein upstream transmission frequency is interleaved across an upstream symbol, wherein the upstream symbol is aligned with the downstream symbol.

14. The non-transitory tangible computer-readable media of claim 11, facilitating full duplex communication in the overall cable network across the frequency range and simplex communication in each individual interference group when the scheduling is implemented in distributed mode.

15. The non-transitory tangible computer-readable media of claim 11, wherein frequency interleaving is added to time interleaving, wherein symbols at each symbol time are rearranged according to a storage access scheme without introducing delay.

16. An apparatus disposed in a cable modem termination system (CMTS) in a cable network, comprising:
a memory for storing data; and
a processor operable to execute instructions associated with the data, wherein the processor and the memory cooperate, such that the apparatus is configured for:
categorizing a plurality of cable modems in the cable network into interference groups;
scheduling upstream transmissions and downstream receptions for cable modems in each interference group, such that no cable modem of any one interference group transmits upstream in a frequency range simultaneously as another cable modem in the same interference group receives downstream in the frequency range, wherein frequency interleaving is added to time interleaving, wherein symbols at each symbol time are rearranged according to a storage access scheme without introducing delay;
generating scheduling information of the scheduling; and
transmitting the scheduling information to the cable modems.

17. The apparatus of claim 16, wherein downstream transmission time is interleaved such that transmitted data spans multiple symbols overlapped with each other, wherein upstream transmission time is not interleaved.

18. The apparatus of claim 16, wherein downstream transmission frequency is interleaved across a downstream symbol spanning a frequency range of an orthogonal frequency division multiplex block, wherein upstream transmission frequency is interleaved across an upstream symbol, wherein the upstream symbol is aligned with the downstream symbol.

19. The apparatus of claim 18, wherein the interference groups are sorted into interference blocks, wherein each interference block comprises a plurality of symbols including a symbol for guard time, wherein interleaving is implemented using the interference blocks.

* * * * *